June 18, 1957 C. T. McLUEN 2,795,932
HYDRAULIC ACTUATING MECHANISM FOR OPERATING
ELECTRIC CIRCUIT BREAKERS AND THE LIKE
Filed Aug. 19, 1952 12 Sheets-Sheet 1
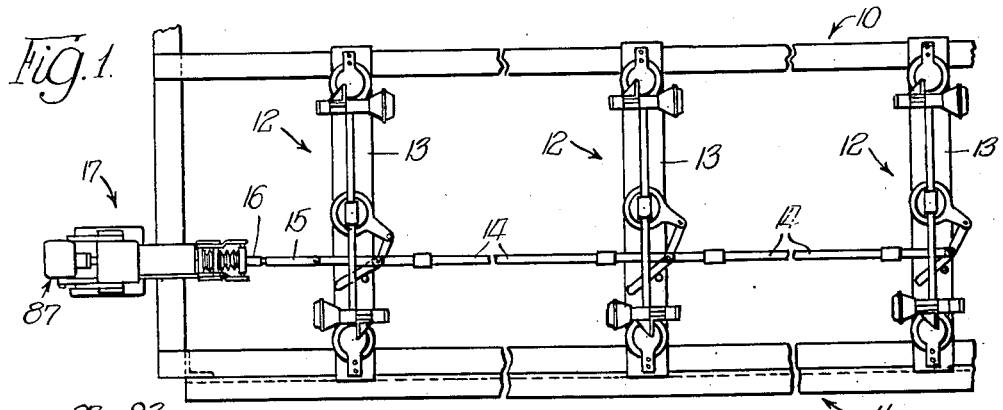
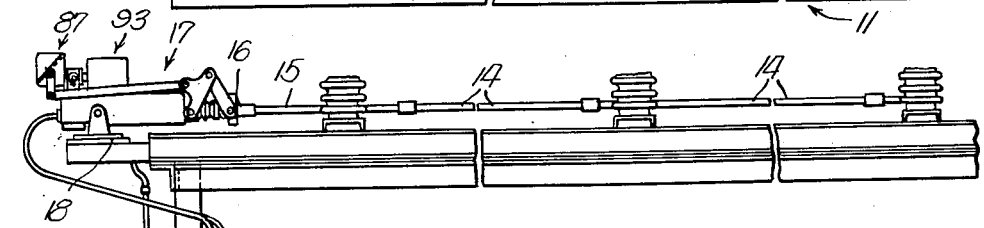
INVENTOR.
Carl T. McLuen,
BY
Robert R. Lockwood

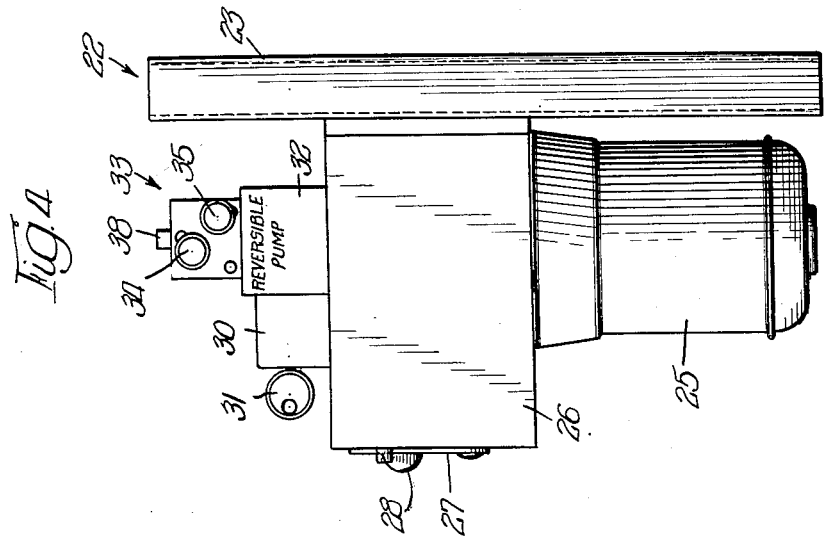
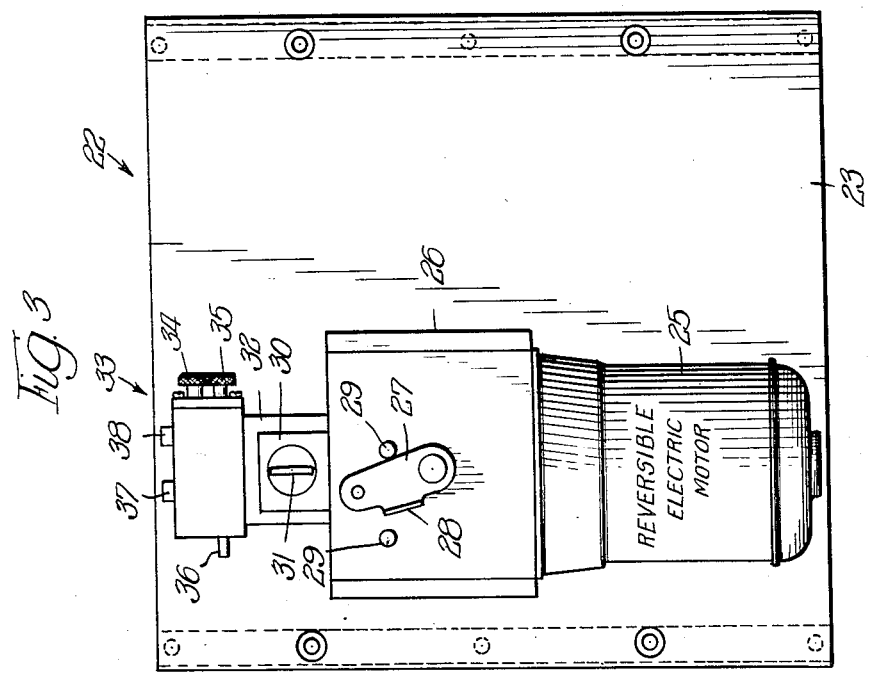

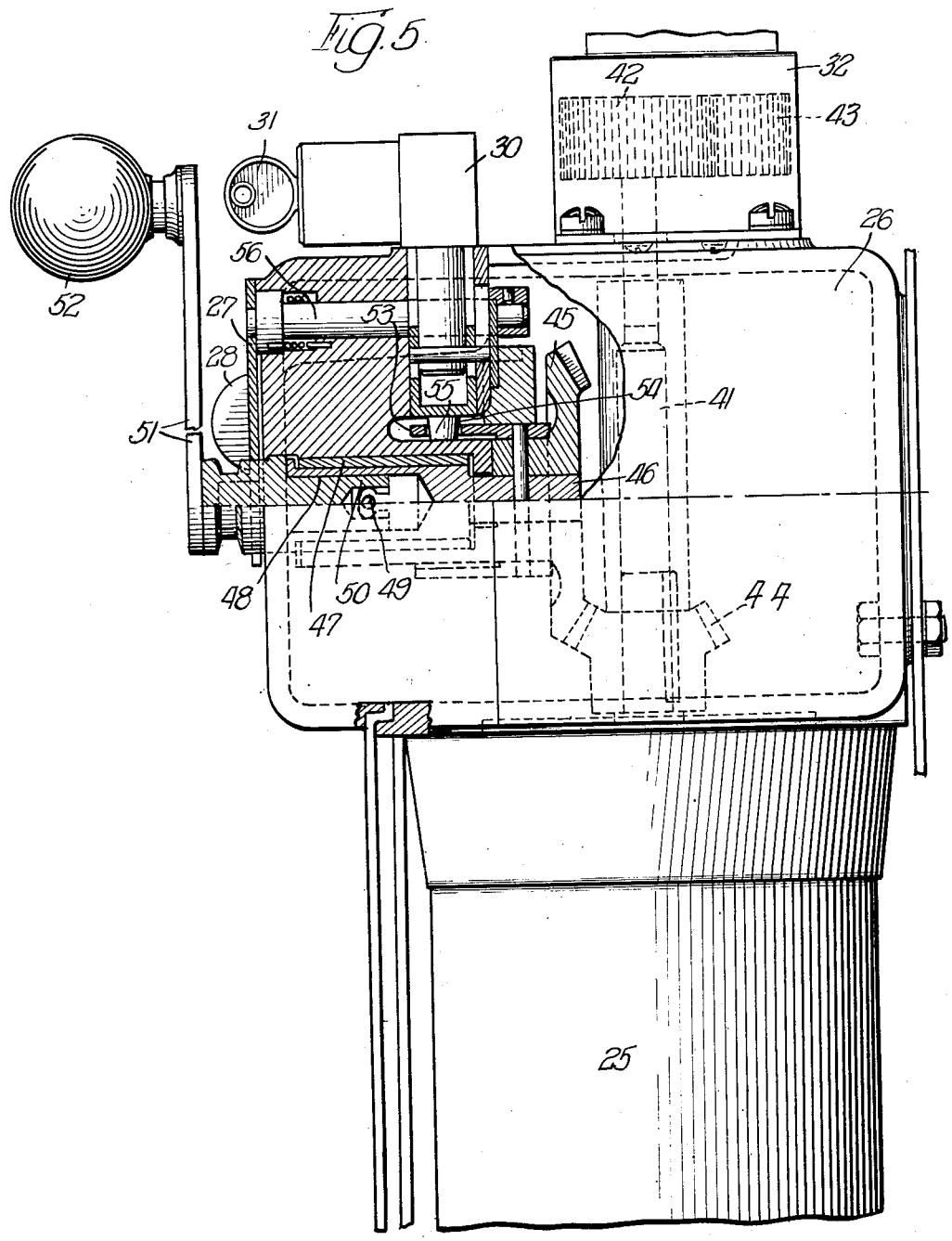

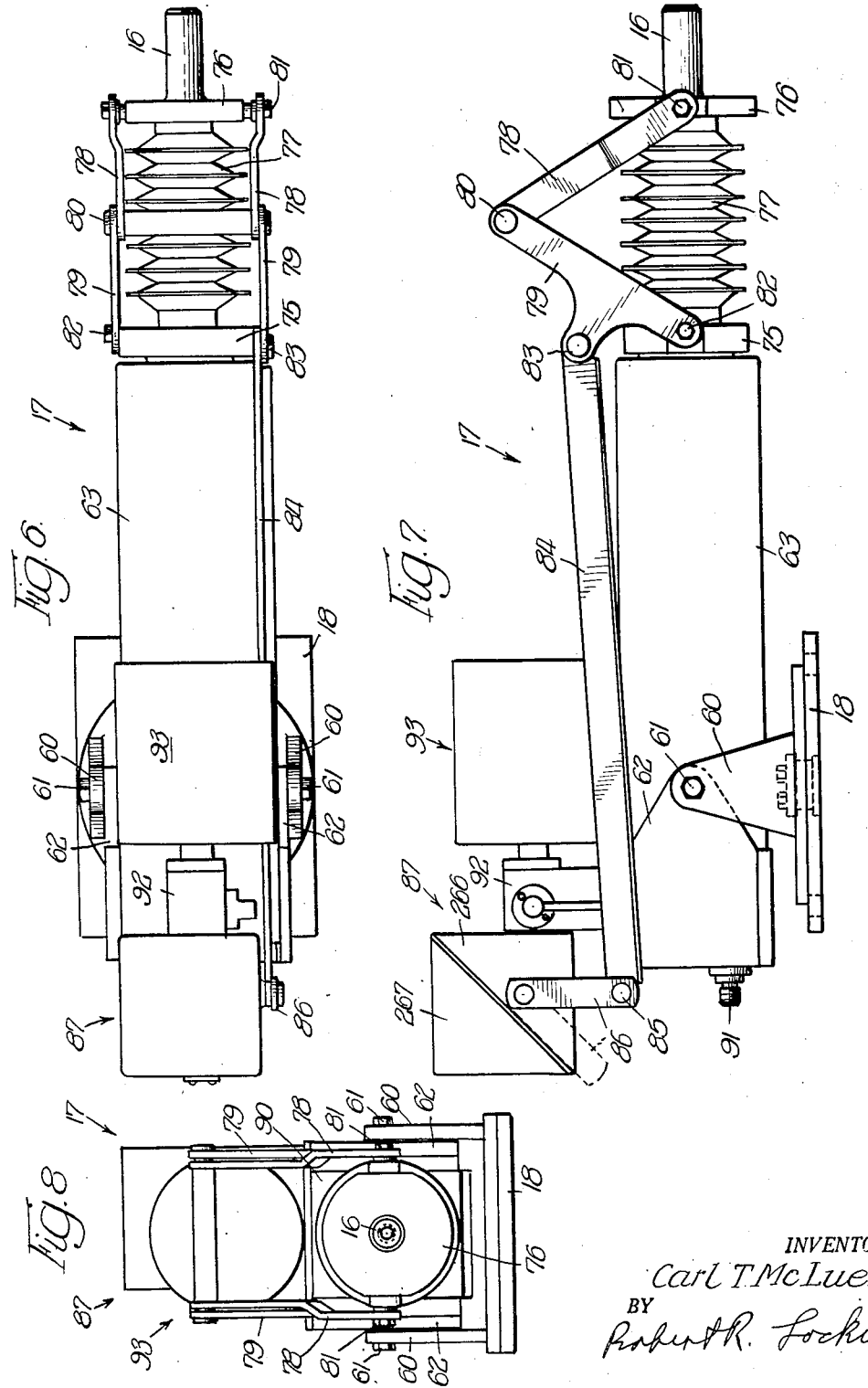

June 18, 1957     C. T. McLUEN     2,795,932
HYDRAULIC ACTUATING MECHANISM FOR OPERATING
ELECTRIC CIRCUIT BREAKERS AND THE LIKE
Filed Aug. 19, 1952     12 Sheets-Sheet 5
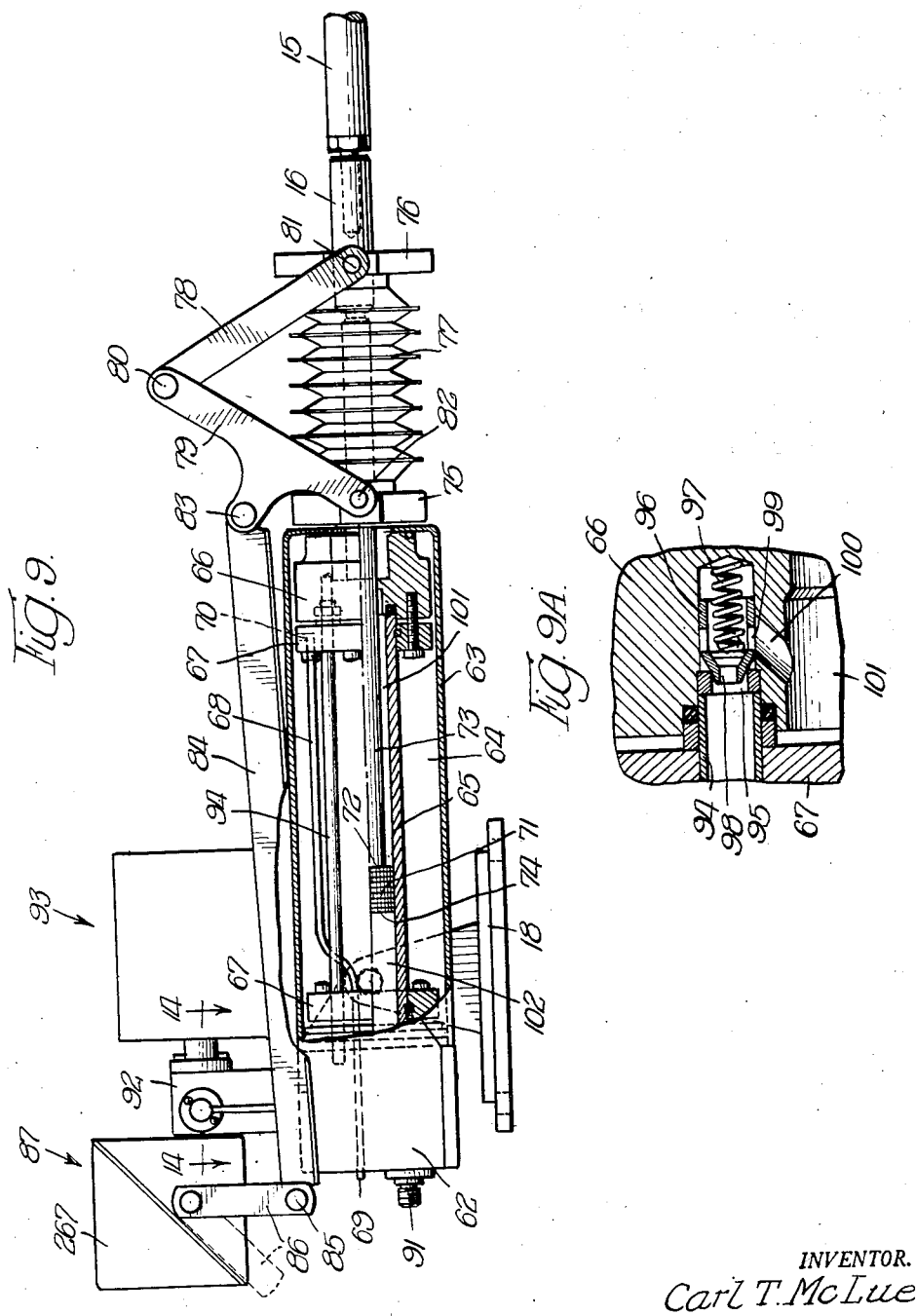
INVENTOR.
Carl T. McLuen,
BY
Robert R. Lockwood
ATTY.

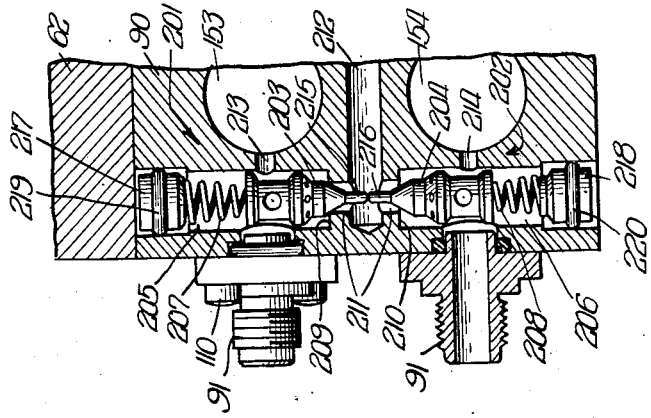
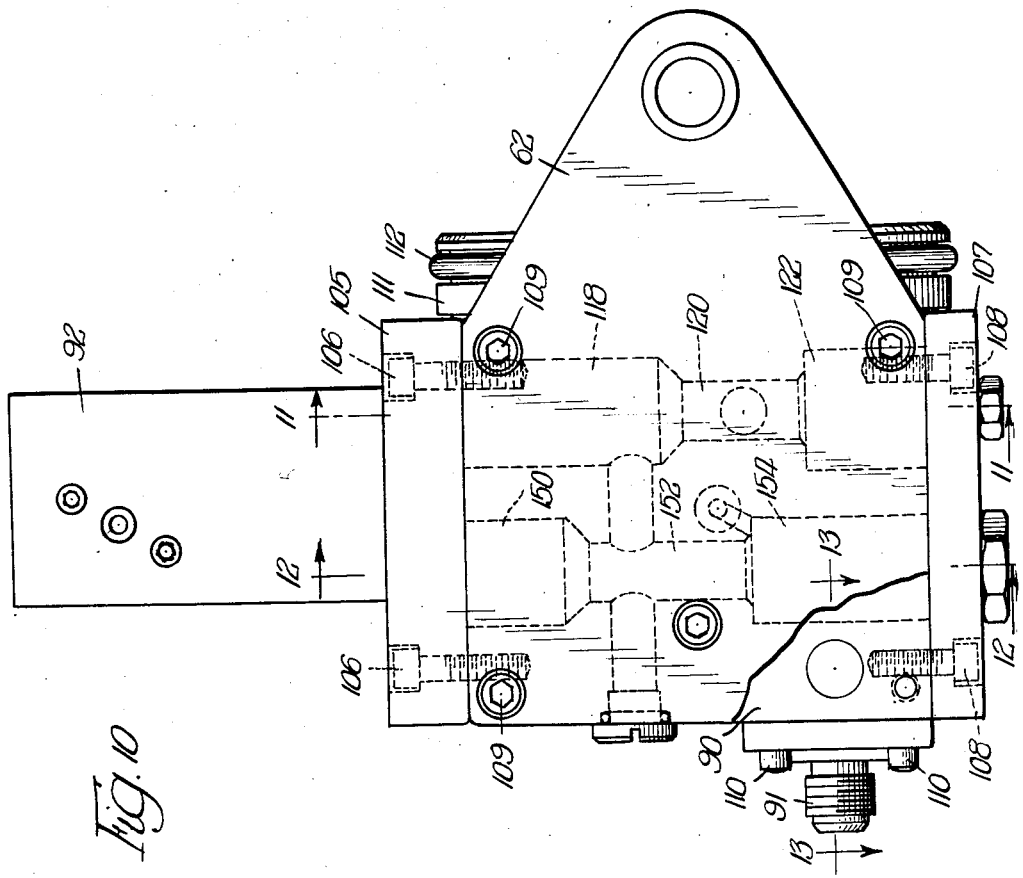

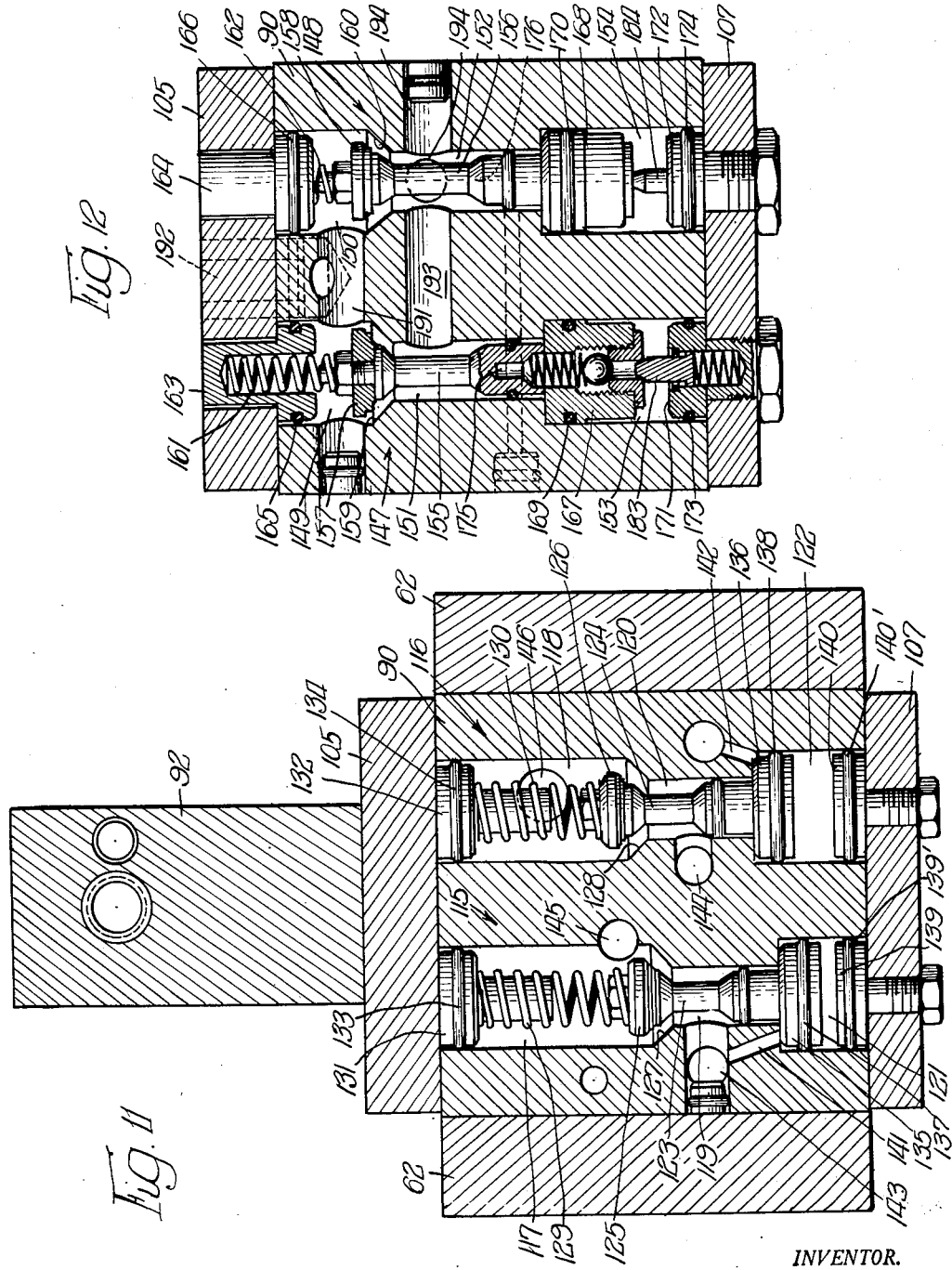

June 18, 1957  C. T. McLUEN  2,795,932
HYDRAULIC ACTUATING MECHANISM FOR OPERATING
ELECTRIC CIRCUIT BREAKERS AND THE LIKE
Filed Aug. 19, 1952  12 Sheets-Sheet 8
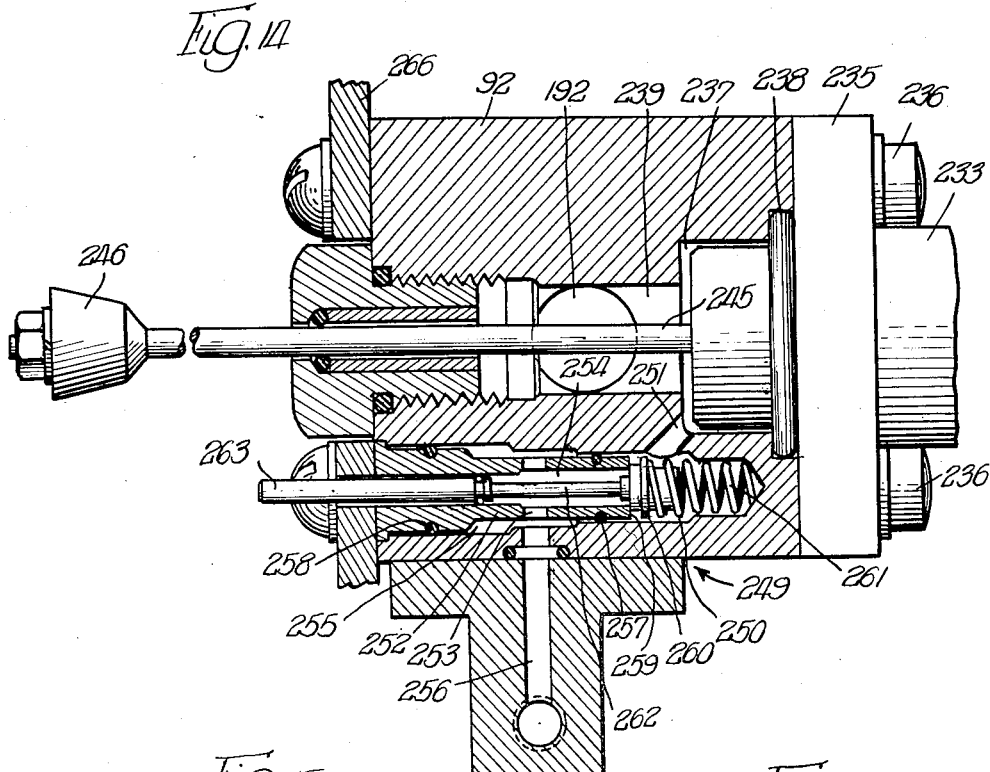
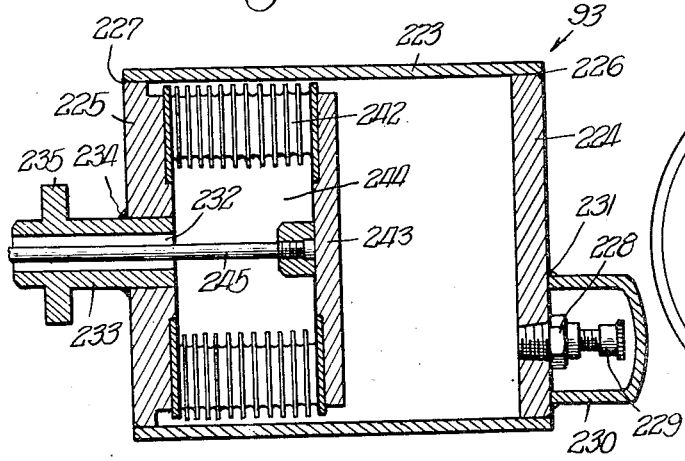
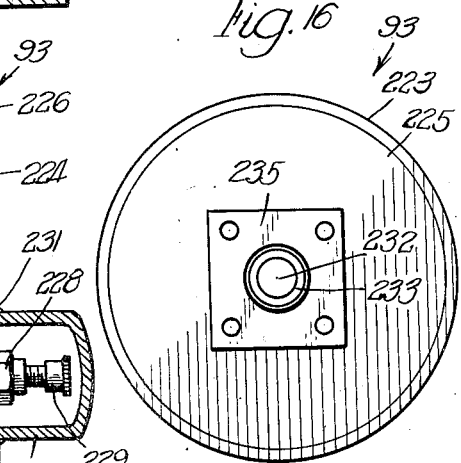
INVENTOR.
Carl T. McLuen,
BY Robert R. Lockwood
atty

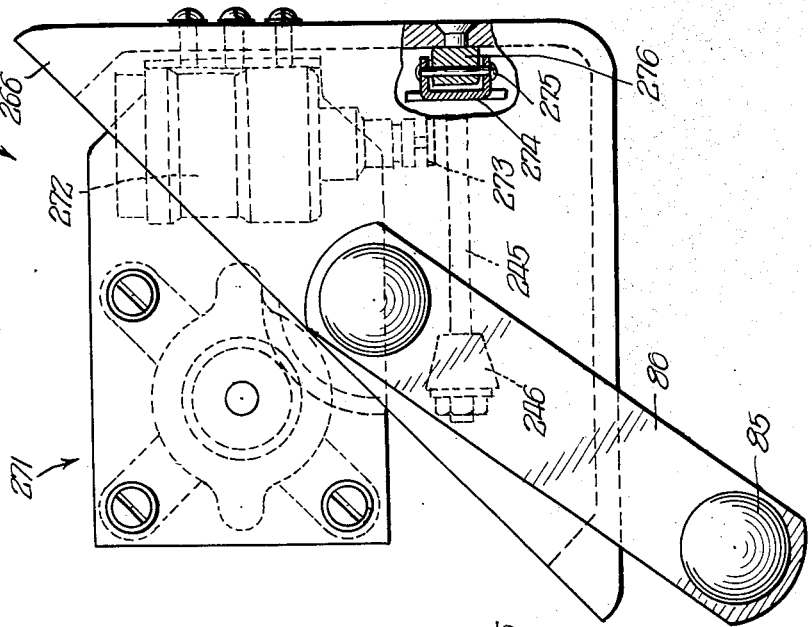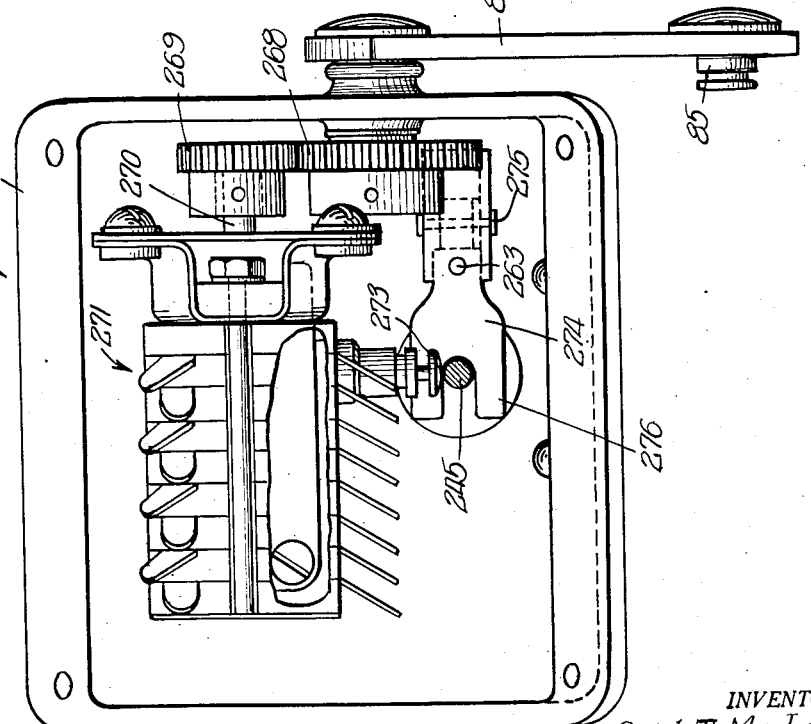

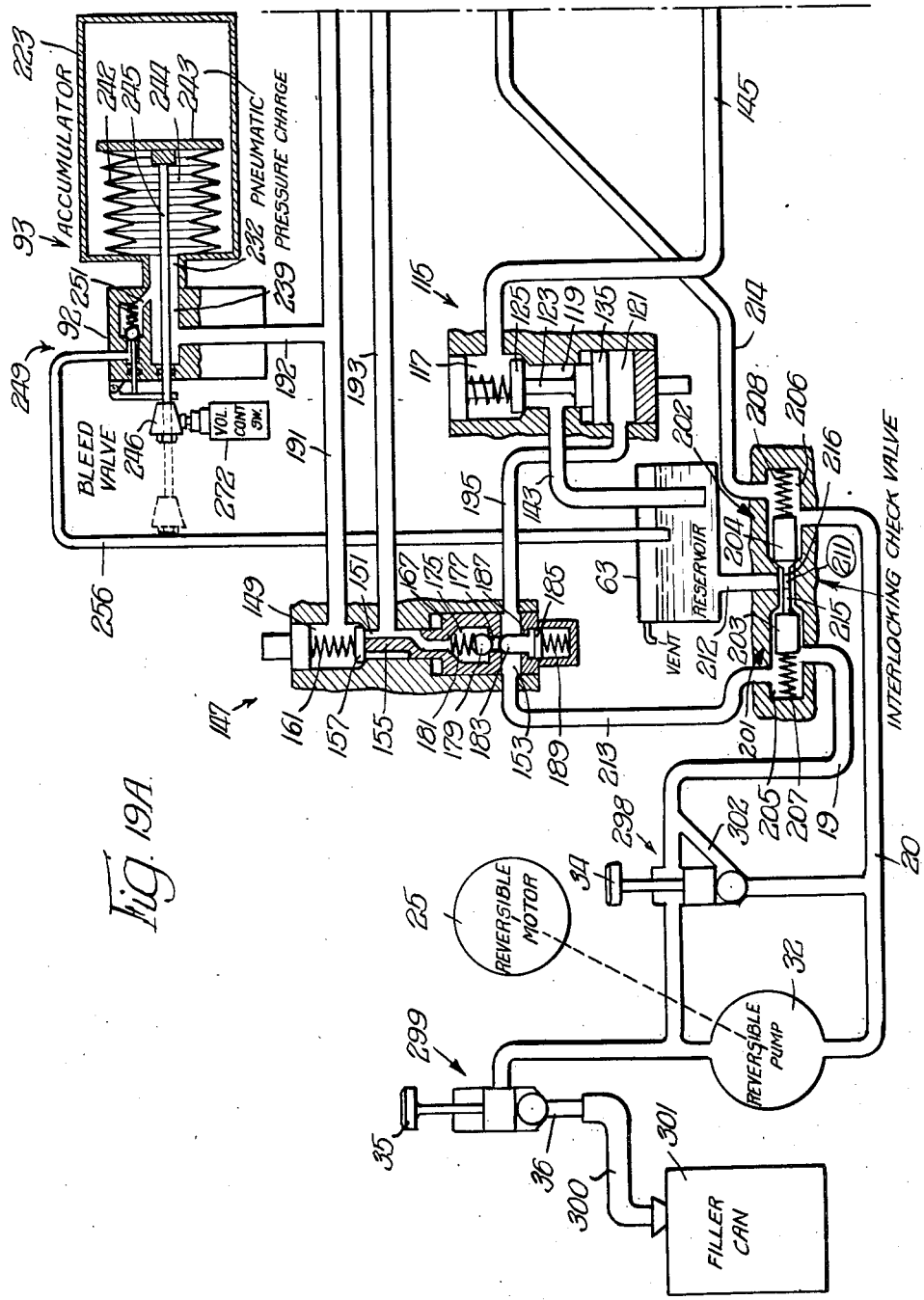

June 18, 1957

C. T. McLUEN 2,795,932

HYDRAULIC ACTUATING MECHANISM FOR OPERATING
ELECTRIC CIRCUIT BREAKERS AND THE LIKE

Filed Aug. 19, 1952

INVENTOR.
Carl T. McLuen,
BY
Robert R. Lockwood
Atty.

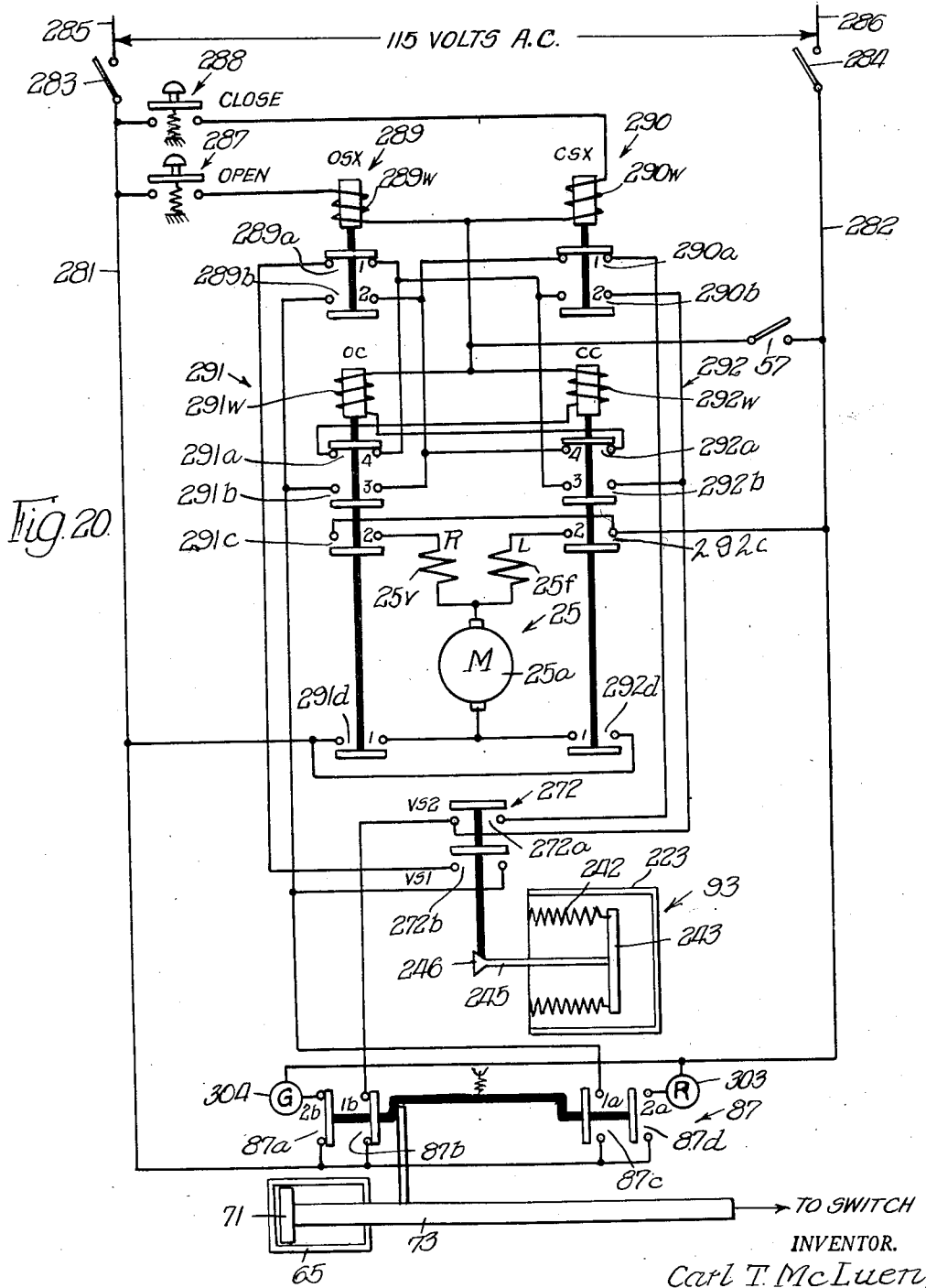

United States Patent Office 2,795,932
Patented June 18, 1957

2,795,932

HYDRAULIC ACTUATING MECHANISM FOR OPERATING ELECTRIC CIRCUIT BREAKERS AND THE LIKE

Carl T. McLuen, Des Plaines, Ill., assignor to S & C Electric Company, Chicago, Ill., a corporation of Delaware Application August 19, 1952, Serial No. 305,231

24 Claims. (Cl. 60—51)

This invention relates, generally, to hydraulic devices, and it has particular relation to hydraulic actuating mechanisms for operating electric circuit breakers and the like.

Among the objects of this invention are: To provide for operating a device, such as an electric circuit breaker, from one position to another in a simple, efficient, and economical manner; to accomplish this hydraulically and without the use of solenoid operated valves; to effect control and direction of operation of the device by reversing the direction of application of hydraulic pressure; to provide positive dependable operation at any time in a relatively long period such as several months or years; to employ a reversible pump driven by reversible drive means, such as a reversible electric motor, to provide the control; to store a quantity of hydraulic fluid under high pressure in an accumulator and to release the energy stored therein to effect actual operation of the device at relatively high speed; to employ a relatively small capacity pump and drive means therefor to recharge the accumulator over a relatively long time between operations of the device; to employ the same pump for effecting control that is used for recharging the accumulator; to arrest operation of the pump when a predetermined volume of the hydraulic fluid has been stored in the accumulator; to discharge excess hydraulic fluid from the accumulator when a given volume beyond a normal volume thereof has been stored therein; to maintain automatically a predetermined volume of hydraulic fluid in the accumulator resulting from gradual loss of fluid from the accumulator; and to control the rate of flow of the hydraulic fluid and thereby the speed of operation of the device.

Other objects of this invention will, in part, be obvious and in part appear hereinafter.

This invention is disclosed in the embodiment thereof shown in the accompanying drawings, and it comprises the features of construction, combination of elements, and arrangement of parts which will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 1 is a top plan view of a typical switch installation with which the present invention can be employed to provide the means for operating the switch from and to the closed position;

Figure 2 is a view, in side elevation, of a portion of the switch structure and its support means therefor as shown in Figure 1;

Figure 3 is a view, in front elevation, of a typical power unit which is located at a point remote from the actuating unit;

Figure 4 is a view, in side elevation, of the power unit shown in Figure 3;

Figure 5 is a view, partly in side elevation and partly in section, showing the gear box which forms a part of the power unit and certain of the associated operating mechanism;

Figure 6 is a top plan view of the actuating unit which is located at a point remote from the power unit shown in Figures 3 and 4;

Figure 7 is a view, in side elevation, of the actuating unit as shown in Figure 6;

Figure 8 is a view, in end elevation, of the actuating unit as shown in Figure 7, the view being taken looking from right to left of Figure 7;

Figure 9 is a view, partly in side elevation and partly in section, showing certain details of construction of the actuating device;

Figure 9A is a view at an enlarged scale and in section, showing the arrangement of the restricted orifice check valve employed in the actuating device;

Figure 10 is a view, in side elevation, of the valve head employed in the actuating device shown in Figures 7 and 9, the view being at an enlarged scale and showing by broken lines the outlines of certain of the valve chambers and passageways;

Figures 11, 12, and 13 are detailed sectional views taken generally along the lines 11—11, 12—12 and 13—13, respectively, of Figure 10;

Figure 14 is a detail sectional view taken generally along the line 14—14 of Figure 9;

Figure 15 is a longitudinal sectional view of the accumulator;

Figure 16 is a view, in end elevation, of the accumulator, the view being taken looking from left to right of Figure 15;

Figure 17 is a view, in rear elevation, of the switch mechanism as shown in Figure 15, the rod from the accumulator being shown in section and the conical head at the outer end thereof being omitted for the sake of clarity;

Figure 18 is a view, partly in side elevation and partly in section and at an enlarged scale, of the switch mechanism and associated operating parts shown in Figure 9;

Figures 19A and 19B taken together, Figure 19A being placed to the left of Figure 19B, illustrate diagrammatically the hydraulic system disclosed herein, the various valves and passageways being shown schematically in order to illustrate more clearly the operating principles of the invention; and Figure 20 illustrates diagrammatically the circuit connections which can be employed in practicing this invention.

Referring now particularly to Figures 1 and 2 of the drawings, it will be observed that the reference character 10 designates, generally, an electric circuit breaker. The details of construction of the electric circuit breaker 10 form no part of the present invention. For illustrative purposes it is pointed out that the electric circuit breaker as shown in the copending application of Lindell Serial No. 195,610, filed November 14, 1950, now Patent No. 2,685,044 issued July 27, 1954, and assigned to the assignee of this application can be employed in conjunction with the present invention. However, it will be understood that other forms of electric circuit breakers can be used and also that other devices can be operated by the hydraulic mechanism of the present invention.

The electric circuit breaker 10 is mounted on a suitable supporting structure, shown generally at 11, and it may comprise three switch units 12, one for each phase of a three-phase alternating current electric power distribution system. The switch units 12 are mounted on bases 13 carried by the supporting structure 11 and they are arranged for gang operation by interphase rods 14 which interconnect the operating mechanism of the switch units 12. The connecting rod 15 interconnects the left-hand switch unit 12 with a coupling 16 on an actuating unit, shown generally at 17, which is constructed in accordance with this invention. It will be observed that the actuating unit 17 is provided with a base 18 that is carried by the supporting structure 11. A pair of high pressure conduits 19 and 20 and an electric control cable 21 serve to operatively interconnect the actuating unit 17 with a power unit, shown generally at 22, which may be mounted on a base 23 at the lower portion of the structure 11. It will be understood that the actuating unit 17 can be mounted entirely independently of the power unit 22, since there need be no fixed mechanical interconnection therebetween. Thus the actuating unit 17 may be located, if desired, alongside of the power unit 22 or it may be located remotely therefrom as in Figure 2 of the drawings.

Referring now to Figures 3 and 4 of the drawings, it will be observed that certain details of construction of the power unit 22 are there shown more clearly. The power unit 22 includes a reversible series type electric motor 25 which will be described in more detail hereinafter. The motor 25 is mounted on the underside of a gear box 26 that is carried by the base 23. On the front side of the gear box 26 is a cover plate 27 having a handle 28 extending therefrom to facilitate operation. Stops 29 extending from the front side of the gear box 26 limit the movement of the cover plate 27. The purpose of the cover plate 27 is to provide for manual operation of the hydraulic system of the present invention by the insertion of a crank through an opening obscured by the cover plate 27 in a manner to be described.

It is desirable to insure that the system cannot be operated under certain circumstances; as for example, when it is desired to work on the electric power system in which the electric circuit breaker 10 is connected. For this purpose a lock 30 is employed having a key 31 which is removable. The manner in which the lock 30 functions will be described presently. Mounted upon the upper side of the gear box 26 and arranged to be driven by the motor 25 is a reversible gear type constant volume pump 32. Above it is located a filler valve assembly, shown generally at 33, which is employed to permit the filling of the system with hydraulic fluid or for draining the same therefrom. The filler valve assembly 33 includes a valve operated by a by-pass valve handle 34 and a filler valve arranged to be operated by a filler valve handle 35. An inlet 36 extends from the filler valve assembly 33 for connection to a suitable filler can containing hydraulic fluid. Outlets 37 and 38 also extend from the filler valve assembly 33 for connection to the high pressure conduits 19 and 20.

Referring now particularly to Figure 5 of the drawings, it will be observed that the reversible electric motor 25 is arranged to rotate a shaft 41 on the upper end of which there is fast a pump gear 42. Cooperating with the pump gear 42 is another pump gear 43. It will be understood that reverse operation of the motor 25 causes reverse rotation of the pump gears 42 and 43 and consequent reverse flow of hydraulic fluid through the pump 32.

Secured to the lower end of the shaft 41 is a bevel gear 44 which is arranged to drive a bevel gear 45 carried by a shaft 46 that is journalled in a bearing 47. The shaft 46 has a cylindrical opening 48 provided with a transverse pin 49 with which jaws 50 of a crank 51 are arranged to cooperate for turning manually the shaft 41 and thereby manually operating the pump 32. A handle 52 for the crank 51 facilitates operation thereof. Now it will be understood that the cover plate 27 is swung aside by its handle 28 to permit entry of the crank 51 into the cylindrical opening 48 of the shaft 46. It will be understood that, under normal operating conditions, the crank 51 will be withdrawn from the gear box 26 and that the cover plate 27 will be in the position thereof illustrated in Figure 3 of the drawings.

The lock 30 is provided to prevent unauthorized operation of the mechanism. For this purpose a sleeve 53 is provided which is fast on the bevel gear 45 and has radially opening apertures 54 therein for receiving a pin 55 which is connected to the lock 30 so that it can be withdrawn from one of the apertures 54 and permit free rotation of the bevel gear 45.

It is desirable to prevent electrical operation of the system when the crank 51 is inserted as shown in Figure 5. For this purpose the cover plate 27 is mounted to rock with a shaft 56 and it is arranged to operate a manual interlocked switch 57, Figure 20, which opens all of the energizing circuits for the electrical system except for the indicating lamps to be described.

The details of construction of the actuating unit 17 are illustrated more clearly in Figures 6, 7, 8, and 9 of the drawings to which reference now will be had. It will be observed that the actuating unit 17 is mounted for movement about an axis, in the embodiment shown about a horizontal axis, for the purpose of more readily accommodating itself to operation of the electric circuit breaker 10. For this purpose the base 18 is provided with a pair of upstanding arms 60 which pivotally mount at 61 ears 62 which support the actuating device 17.

The hydraulic fluid which is employed for operating the actuating unit 17 is stored in a reservoir 63 providing an annular space 64 around a coaxially disposed ram cylinder 65. The reservoir 63, which is generally cylindrical in shape, is disposed in fluid-tight relation with respect to the ram cylinder 65 which has at its right-hand end a rod cap 66. Cylinder collars 67 near the ends of the ram cylinder 65 serve to mount the same in position within the reservoir 63. It is desirable to maintain the annular space 64 within the reservoir 63 at atmospheric pressure. For this purpose a breather tube 68 is employed and it is open to the atmosphere at 69. It communicates at its other end through a breather opening 70 in one of the cylinder collars 67 with the annular space 64.

Slidably mounted within the ram cylinder 65 is a ram 71. From the front side 72 of the ram 71 a ram rod 73 extends out of the ram cylinder 65 and rod cap 66. The area of the cross-section of the ram rod 73 within the ram cylinder 65 is equal to one-half of the area of the rear side 74 of the ram 71. Accordingly the area of the front side 72 of the ram 71 which is exposed to hydraulic pressure is equal to one-half of the area of the rear side 74. This arrangement of areas permits the use of a differential hydraulic circuit in which the same speed in either direction for the ram 71 is obtained using the same unit pressure of the hydraulic fluid within the ram cylinder 65. The ram rod 73, as indicated, extends outwardly through the rod cap 66. Also it extends outwardly through the adjacent end of the surrounding reservoir 63 and through a plate 75 fastened to the end of the reservoir 63. At its extreme right-hand end it is attached to the coupling 16 which, it will be recalled, has the connecting rod 15 attached thereto. A plate 76 extends from the coupling 16 and is movable therewith. With a view to protecting the exposed surface of the ram rod 73 outside of the ram cylinder 65, a bellows 77, connected at its ends to the plates 75 and 76, surrounds the same as illustrated more clearly in Figure 9.

It is desirable to provide certain control functions when the electric circuit breaker 10 has been operated to either extremes of its movement, i. e., either to the switch closed position or to the switch open position. Accordingly, links 78 and 79 are pivotally interconnected at 80 and are pivoted at 81 to the plate 76 and at 82 to the plate 75. At 83 the link 79 has a long link 84 pivoted thereto. The other end of the link 84 is pivoted at 85 to an arm 86 which is arranged to operate a limit switch assembly shown generally at 87. The particular details of construction of the limit switch assembly 87 will be set forth hereinafter.

An important part of the present invention resides in the construction and arrangement of the valves which are employed for controlling the flow of hydraulic fluid into and out of the ram cylinder 65. These valves are located in a valve head 90, Figure 8, which is positioned between the ears 62. By positioning the valve head 90 in this location, it is possible to reduce to a minimum the length of the passageways required for directing the flow of hydraulic fluid to accomplish the desired operation of the ram 71. The details of construction of the valve assemblies in the valve head 90 will be described presently. Inlets 91 are provided on the valve head 90 for connection to the pair of high pressure conduits 19 and 20 to receive the hydraulic fluid from the power unit 22.

The valve head 90 has an extension 92 thereabove which not only supports the limit switch assembly 87 but also an accumulator that is indicated, generally, at 93. The accumulator 93 is provided for the purpose of storing the hydraulic fluid under relatively high pressure so that energy stored therein can be used for moving the ram 71 on the opening of the proper valves in the valve head 90 without requiring the flow of substantial amount of hydraulic fluid from the power unit 21.

The hydraulic fluid flows from the valve head 90 through a tube 94 which provides a passageway between the valve head and the front side 72 of the ram 71. It is desirable that the flow of fluid through the tube 94 react against the front side 72 of the ram 71 and be substantially unrestricted while the flow in the reverse direction is restricted in order to permit control of the speed of movement of the ram 71 when hydraulic pressure is applied to its rear side 74. For this purpose, as shown in Figure 9A, the tube 94 has a valve seat 95 on which a valve 96 is arranged to seat. A coil compression spring 97 acts to bias the valve 96 to the closed position shown in the drawings. When the valve 96 is seated, as shown in Figure 9A, a restricted orifice 98 therein limits the flow of hydraulic fluid while, when the valve 96 is lifted off the valve seat 95 by the flow of hydraulic fluid, the same is substantially unimpeded. Radial openings 99 are provided in the valve 96 for communicating with a passageway 100 in the rod cap 66 which opens into a front cylinder space 101 which is the space around the ram rod 73 between the front side 72 of the ram 71 and the rod cap 66. A rear cylinder space 102 is defined by the wall of the ram cylinder 65 and by the rear side 74 of the ram 71 and the side of the valve head 90 which closes off the end of the ram cylinder 65.

In Figure 10 of the drawings certain details of construction of the valve head 90 and associated parts are shown more clearly. It will be noted that a base plate 105 is mounted on top of the valve head 90 and is secured thereto by socket head machine screws 106. The base 105 constitutes an integral part of the extension 92. A bottom plate 107 is secured by socket head machine screws 108 to the underside of the valve head 90. The ears 62 are secured to the sides of the valve head 90 by means of socket head machine screws 109. Screws 110 serve to hold the inlet fittings 91 to the rear face of the valve head 90. On the forward side of the valve head 90 there is provided a cylindrical boss 111 over which the reservoir 63 fits. Sealing engagement therebetween is provided by an O ring 112.

In Figure 11 of the drawings, certain of the details of construction of directional valves 115 and 116 are shown. These valves are essentially the same in construction but are located in slightly different positions in the valve head 90 in order to facilitate connections to various parts of their valve chambers. Since their functions in the system are slightly different, separate reference characters are applied thereto throughout. The directional valves 115 and 116 have valve chambers which are bored out of the valve head 90. Each chamber includes an upper valve chamber 117 and 118, and intermediate valve chamber 119 and 120, and a lower valve chamber 121 and 122. Valve stems 123 and 124 are provided, carrying at their upper ends valve members 125 and 126 respectively.

These valve members are arranged to engage valve seats 127 and 128 and are urged thereagainst downwardly by valve springs 129 and 130. The upper ends of the upper valve chambers 117 and 118 are closed off by top seal plugs 131 and 132 and co-operating O rings 133 and 134. At their lower ends the valve stems 123 and 124 carry pistons 135 and 136 which have O rings 137 and 138 to provide the necessary sealing engagement with the respective lower valve chambers 121 and 122. The lower portions of these chambers are closed off by bottom seal plugs 139 and 140 which are provided with O rings 139' and 140'.

Various passageways are bored in the valve head 90. Pressure back of the pistons 135 and 136 is relieved through passageways 141 and 142 which connect to the reservoir 63. Passageway 143 also interconnects the intermediate valve chamber 119 with the reservoir 63 as is shown more clearly in Figure 19. The intermediate chamber 120 is connected by passageway 144 to the rear cylinder space 102. A passageway 145 interconnects the upper valve chamber 117 with the rear cylinder space 102. As shown in Figure 19 a restricted orifice 145' is provided in the passageway 145 for the purpose of limiting the flow of hydraulic fluid out of the rear cylinder space 102 when hydraulic pressure is applied to the front side 72 of ram 71. A passageway 146 from the upper valve chamber 118 interconnects the same with the passageway in the tube 94 which supplies hydraulic fluid to the front side 72 of the ram 71.

Figure 12 shows certain details of construction of accumulator valves 147 and 148 which are employed in conjunction with the directional valves 115 and 116 for controlling the flow of hydraulic fluid to and from the accumulator 93 for moving the ram 71 from one end of the cylinder 65 to the other. Since the accumulator valves 147 and 148 function individually with the directional valves 115 and 116, separate reference characters have been applied thereto. Their details of construction, however, are identical. The accumulator valves 147 and 148 are provided with chambers each having an upper valve chamber 149 and 150, an intermediate valve chamber 151 and 152, and a lower valve chamber 153 and 154. Valve stems 155 and 156 are slidably mounted in the respective valve chambers. At their upper ends the valve stems 155 and 156 carry valve members 157 and 158 which are arranged to engage valve seats 159 and 160. Springs 161 and 162 bias the valve members 157 and 158 against the valve seats 159 and 160. These valve springs are located in top seal plugs 163 and 164 which have O rings 165 and 166. At their lower ends the valve stems 155 and 156 are provided with pistons 167 and 168. The areas of these pistons 167 and 168 are smaller than the areas of the pistons 135 and 136 of the corresponding directional valves 115 and 116. The purpose of the difference is to insure that the directional valves 115 and 116 will be operated before the accumulator valves 147 and 148 are operated so that one or the other of the cylinder spaces 101 or 102 is vented to the reservoir 63 or is vented to the other cylinder space. The ram 71 then can be moved from one position to the other on application of pressure from the accumulator 93. O rings 169 and 170 are provided on the pistons 167 and 168. At their lower ends the lower valve chambers 153 and 154 have bottom seal plugs 171 and 172 and they are provided with O rings 173 and 174.

The accumulator 93 is recharged through the accumulator valves 147 and 148. For this purpose the valve stems 155 and 156 are provided with longitudinally extending passageways 175 and 176, Figures 19A, and 19B, which open at their upper ends into the intermediate valve chambers 151 and 152. The lower ends 177 and 178 of the passageways 175 and 176 are closed by ball check valves 179 and 180 biased by springs 181 and 182. Pressure within the accumulator 93 tends to hold the ball check valves 179 and 180 closed in addition to the force exerted thereon by the springs 181 and 182. It will be understood that the passageways between the accumulator 93 and the accumulator valves 147 and 148 are filled with hydraulic fluid under pressure either from the pump 32 or the accumulator 93. When the pump 32 no longer applies pressure, the accumulator valves 147 and 148 are closed by pressure from the accumulator 93 transmitted through passageways 192 and 191 to the upper valve chambers 149 and 150. Since the intermediate valve chambers 151 and 152 are filled with hydraulic fluid and there is some leakage past the valve members 157 and 158, as pointed out hereinafter, the pressure from the accumulator 93 is applied to the ball check valves 179 and 180 in the same direction that the springs 181 and 182 act to hold them closed. The ball check valves 179 and 180 are arranged to be opened on application of pressure thereto from the pump 32 in a manner to be described.

With a view to insuring that the valve members 157 and 158 are unseated the lower ends 177 and 178 of the passageways 175 and 176 are closed by feed valves 183 and 184 which are mounted in the bottom seal plugs 171 and 172. Each of the feed valves 183 and 184 has a head 185 and 186 which cooperates with a stop 187 and 188 to limit the upward movement. Springs 189 and 190 bias the feed valves 183 and 184 upwardly to close off the lower ends 177 and 178 of the passageways 175 and 176. It will be understood that, on application of pressure to the undersides of the pistons 167 and 168, the feed valves 183 and 184 will initially move upwardly therewith until their heads 185 and 186 engage the stops 187 and 188. Sufficient conjoint movement is provided to insure that the valve members 157 and 158 are unseated and that hydraulic fluid can flow from the accumulator 93 to either the front or the rear cylinder space 101 or 102 as the case may be.

As before, passageways are drilled into the valve head 90 for making the necessary connections to the various parts of the valve chambers of the accumulator valves 147 and 148. A passageway 191 interconnects the upper valve chambers 149 and 150 and a passageway 192 interconnects the passageway 191 with the accumulator 93 as shown more clearly in Figures 19A and 19B of the drawings. A passageway 193 interconnects the intermediate valve chambers 151 and 152 and another passageway 194 connects the intermediate valve chamber 152 with the passageway provided by the tube 94 and the passageway 146. Passageways 195 and 196, not shown in Figures 11 and 12 but shown in Figures 19A and 19B, interconnect the lower valve chambers 153 and 154 of the accumulator valves 147 and 148 with the lower valve chambers 121 and 122 of the directional valves 115 and 116.

In Figure 13 of the drawings, the details of construction of check valves 201 and 202 are illustrated. These valves are operated depending upon the direction in which the pump 32 is operated for the purpose of controlling the return of the hydraulic fluid to the reservoir 63. Check valves 201 and 202 include check valve members 203 and 204 which are slidably mounted in end portions 205 and 206 of a check valve chamber which extends through the valve head 90. The valve members 203 and 204, as shown, are provided with openings through which the hydraulic fluid flows whereby they are moved partly as a result of fluid flow therethrough and partly as a result of vacuum applied to one or the other. Springs 207 and 208 act to bias the valve members 203 and 204 toward valve seats 209 and 210 at the ends of an intermediate portion 211 of the check valve chamber. A passageway 212 interconnects the intermediate portion 211 of the check valve chamber with the reservoir 63 as shown more clearly in Figures 19A and 19B of the drawings. Passageways 213 and 214 interconnect the end portions 205 and 206 of the check valve chamber with the lower valve chambers 153 and 154 of the accumulator valves 147 and 148.

It is desirable that, when one of the valve members 203 or 204 is seated, the other be unseated as shown in Figure 13. For this purpose valve stems 215 and 216 extend from the valve members 203 and 204 into interengaging relationship. The ends of the check valve chamber are closed by end seal plugs 217 and 218 and they are provided with O rings 219 and 220, respectively. It will be observed that the inlet fittings 91 open directly into the end portions 205 and 206 of the check valve chamber. As illustrated more clearly in Figures 19A and 19B, the high pressure conduits 19 and 20, which are connected to the inlets 91, are placed in communication with the end portions 205 and 206 of the check valve chambers.

Figures 14, 15, and 16 of the drawings illustrate in more detail the construction of the accumulator 93 and the manner in which it is mounted on the extension 92. It will be observed that the accumulator 93 includes a cylindrical housing 223 having closure discs 224 and 225 at its ends and secured thereto by welding as indicated at 226 and 227. The construction is such that the accumulator 93 is able to withstand pressures of the order of several hundred pounds per square inch. Preferably the accumulator 93 contains a charge of gas, such as air, under a pressure ranging from 500 to 1000 lbs. per square inch. The air or other gas is introduced through a filler valve 228 which is closed by a screw cap 229. In order to make certain that the accumulator 93 will retain its charge of compressed gas over a period of several years, a closure cap 230 fits over the filler valve 228 and it is welded, as indicated at 231, to the closure disc 224.

The closure disc 225 has a passageway 232 therethrough in which a tubular fitting 233 is inserted and welded at 234. A mounting flange 235 is formed integrally with the tubular fitting 233 and bolts 236 extending therethrough into the extension 92 serve to hold the accumulator 93 securely in position thereon. The outer end of the tubular fitting 233 projects into an opening 237 in the extension 92 and O ring 238 provides a sealed connection therewith. A passageway 239 in the extension 92 places the passageway 232 through the tubular fitting 233 in communication with the passageway 192 as shown more clearly in Figures 19A and 19B of the drawings.

It will be understood that the charge of compressed gas within the accumulator 93 is employed to permit the storage of a quantity of hydraulic fluid under pressure so that the stored up energy can be released to move the ram 71 from one position to the other without requiring that the pump 32 itself supply all of the hydraulic fluid for accomplishing this action. Accordingly, within the cylindrical housing 223 of the accumulator 93 there is positioned a flexible bellows 242 that is formed preferably of stainless steel. One end of the flexible bellows 242 is connected to the closure disc 225 while the other end is secured to a plate 243. It will be understood that the space 244 within the flexible bellows 242 is filled with the hydraulic fluid and that, as the pressure thereof is increased by the pump 32, the plate 243 moves inwardly and further compresses the gas within the cylindrical housing 223. When one or the other of the accumulator valves 147 or 148 is opened, as will be described hereinafter, the charge of gas which has been further compressed within the cylindrical housing 223 acts to move the plate 243 forwardly and compress the flexible bellows 242 to expel the hydraulic fluid through the passageway 232 and through the passageway to be described to apply pressure to either the front side 72 of the ram 71 or to its rear side 74 as the case may be.

It is desirable to provide an indication when the flexible bellows 242 has been charged with the required amount of hydraulic fluid. Preferably a measure of volume of hydraulic fluid is employed rather than a measure of the pressure to which it is charged. The reason for this is that the apparatus may be subjected to widely varying temperatures ranging from —40° F. to above 100° F. Accordingly, the position of the plate 243 is employed for indicating when the desired volume of hydraulic fluid has been charged into the accumulator 93. This is accomplished by providing a rod 245 which, as shown in Figures 15 and 19A, is secured at one end to the plate 243, projects out of the accumulator 93 through the passageway 232, and is provided with a conical head 246 at the other end. As will appear hereinafter the conical head 246 is employed for operating volume control switches for effecting the deenergization of the motor 25 when the predetermined volume of hydraulic fluid has been supplied to the accumulator 93. In addition the conical head 246 also is employed for operating a bleed valve, shown generally at 249 in Figure 14, for the purpose of connecting the space 244 within the flexible bellows 242 to the reservoir 63 when hydraulic fluid in excess of a predetermined volume has been stored in the flexible bellows. This is a safety measure to prevent over stressing of the bellows 242 in the event that the motor 25 should continue to drive the pump 32 after the bellows 242 has been filled to its normal capacity. The bleed valve 249 can be operated manually to discharge the hydraulic fluid from the bellows 242 for maintenance purposes.

The details of construction of the bleed valve 249 now will be described. It will be noted that the extension 92 has a bleed valve chamber 250 therein which is connected by a passageway 251 to the passageway 232 in the closure disc 225. Stationarily mounted within the bleed valve chamber 250 is a bleed valve body 252 which is generally tubular in construction and is provided with radial ports 253 which place the interior 254 of the valve body 252 in communication with a space 255 surrounding the same that is connected by passageway 256 to the reservoir 63, Figures 19A and 19B. O rings 257 and 258 serve to seal the bleed valve body 252 within the bleed valve chamber 250. A valve seat 259 is located at one end of the bleed valve body 252 for receiving a valve member 260 which is biased thereagainst by a coil compression spring 261. A stem 262 extends from the valve member 260 through the valve body 252 and has a projecting portion 263 which can be operated either manually or automatically for the purpose of relieving the pressure within the flexible bellows for maintenance purposes or in the event that the hydraulic fluid stored therein should exceed a predetermined normal volume thereof.

Figures 17 and 18 illustrate in a greater detail the construction of the limit switch assembly 87 and also certain other elements which are associated therewith. As there shown the limit switch assembly 87 includes a case 266 which has a cover 267, Figure 7, which is not shown in Figures 17 and 18. It will be observed that the arm 86 is arranged to rock a gear wheel 268 which meshes with a pinion 269 on a shaft 270 for operating a multipole switch shown generally at 271. The circuit connections to the multipole switch 271 are illustrated in Figure 20 of the drawings and will be described in detail hereinafter. Mounted on the case 266 behind the multipole switch 271 is a volume control switch that is indicated at 272. Its contact arrangement is illustrated in Figure 20. The volume control switch 272 is arranged to be operated by a button 273 at the lower end thereof when it comes in contact with the conical head 246 carried by the rod 245. It will be understood that, when a predetermined volume of hydraulic fluid has been charged into the flexible bellows 242 of the accumulator 93, the rod 245 will be withdrawn and the conical head 246 will engage the button 247 and lift the same. The volume control switch 272 then is operated to deenergize the motor 25 in a manner to be described so that no additional hydraulic fluid is supplied to the accumulator 93.

With a view to operating the bleed valve 249 in the manner described above, a lever 274 is rockably mounted at 275 on a rivet 276 which projects from the rear wall of the case 266. The bifurcated outer end 276 of the lever 274 straddles the rod 245, as shown in Figure 17, so that when the conical head 246 is withdrawn on increase in the volume of hydraulic fluid in the accumulator 223 beyond a predetermined volume, the lever 274 is rocked and depresses the projecting portion 263 of the stem 262 to move the valve member 260 from its valve seat 259 and place the interior of the flexible bellows 242 in communication with the reservoir 63.

In Figure 20 of the drawings the circuit connections for controlling the operation of the reversible motor 25 are shown. For this purpose conductors 281 and 282 are employed and arranged to be connected by switches 283 and 284 to energized conductors 285 and 286. As shown, these conductors can be energized from a suitable alternating current source operating at 115 volts. Ordinarily, when the present invention is employed in conjunction with the operation of the electric circuit breaker 10, the source of alternating current to energize the conductors 285 and 286 is a small capacity transformer. While such a transformer is capable of operating a relatively small motor for the purpose of recharging the accumulator 93 over a relatively long time, such a transformer is not capable of supplying the necessary energy for effecting the operation of the electric circuit breaker 10 without the use of the energy stored in the accumulator 93.

The motor 25 is started in one direction or the other by means of the operation of either of master control switches 287 or 288. Switch 287 is arranged to effect operation of the motor 25 in a direction to operate the electric circuit breaker 10 to the open position while the switch 288 is arranged to effect operation of the motor 25 in a reverse direction to close the electric circuit breaker 10. While the switches 287 and 288 have been illustrated in the form of push buttons for manual control, it will be understood that automatic control circuits can be substituted therefor so that the electric circuit breaker 10 will be opened in response to certain predetermined conditions occurring on the system, such as an overload or the loss of voltage.

It will be noted in Figure 20 of the drawings, that the control switches 287 and 288 are arranged to control the energization of auxiliary relays 289 and 290. These relays are provided with operating windings 289w and 290w, normally closed contacts 289a and 290a, and normally open contacts 289b and 290b. The auxiliary relays 289 and 290 are connected to control the energization of motor control relays 291 and 292. These relays have operating windings 291w and 292w. Also they are provided with normally closed contacts 291a and 292a. In addition they are provided with normally open contacts 291b, 292b, 291c, 292c, 291d, and 292d. It will be noted that the volume control switch 272 is provided with normally closed contacts 272a and 272b which are arranged to be opened when a predetermined volume of hydraulic fluid has been charged into the accumulator 93.

The limit switch assembly 87 includes contacts 87a, 87b, 87c, and 87d. These contacts are provided in the multipole switch 271 shown in Figures 17 and 18 of the drawings. Contacts 87a and 87b are closed only when the ram rod 73 is fully withdrawn within the ram cylinder 65 and the electric circuit breaker 10 is in the full open position. Contacts 87a and 87b are not opened until the ram rod 87 is fully extended and the electric circuit breaker 10 is in the fully closed position, shown in Figure 1 of the drawings. Contacts 87c and 87d are closed only when the ram rod 73 is fully extended and the electric circuit breaker 10 is fully closed. These contacts remain open until the ram rod 73 is fully withdrawn.

In Figures 19A and 19B of the drawings, the arrangement for filling the system with hydraulic fluid or draining it therefrom is shown. It will be recalled that a filler valve assembly 33 is illustrated in Figures 3 and 4 of the drawings having a by-pass valve handle 34 and a filler valve handle 35. In Figures 19A and 19B there is shown at 298 the by-pass valve which is operated by the by-pass valve handle 34. At 299 there is shown the filler valve which is operated by the filler valve handle 35. The inlet 36 to the filler valve 299 is shown as having connected thereto a flexible hose 300 which extends to a filler can 301 which contains a supply of hydraulic fluid for filling the system or provides a receptacle for receiving it when it is to be drained out. It will be observed that a by-pass connection 302 is provided between the conduits 19 and 20 so that in one position of the by-pass valve 298, the by-pass connection 302 is closed. In the other position of the by-pass valve 298, the direct connection of the conduit 19 to one side of the reversible pump 32 is closed and this conduit is connected through the by-pass connection 302 to the same side of the pump 32 that the conduit 20 is connected. The reason for this is that one or the other of the check valves 201 or 202 always is open to provide a connection to the reservoir 63. By connecting both of the conduits 19 and 20 to one side of the pump 32 by means of the by-pass valve 298 there is always a passageway for the flow of hydraulic fluid to or from the reservoir 63, regardless of which of the valves 201 or 202 is open.

Operation

In describing the operation of the invention disclosed herein, principal reference will be made to Figures 19A, 19B and 20 of the drawings. It will be assumed that the electric circuit breaker 10 is in the open position in which case the ram 71 is fully withdrawn as shown in these figures. Also it will be assumed that the space 244 within the flexible bellows 242 of the accumulator 93 has been charged to the required volume and that the air in the cylindrical housing 223 has been further compressed so that the pressure thereof is of the order of from 500 to 1000 lbs. per square inch. Further it will be assumed that the conductors 285 and 286 are energized across a suitable source and that the switches 283 and 284 are closed. It will be understood that the lock 30 has been operated so as to withdraw the pin 55 from engagement with one of the apertures 54 in the sleeve 53 and that the manual interlock switch 57 is closed.

The close control switch 288 now is depressed to complete an energizing circuit for the operating winding 290w of the auxiliary relay 290. This circuit can be traced from energized conductor 281 through the contacts of control switch 288, winding 290w, and manual interlock switch 57 to energized conductor 282. At contacts 290b, the energizing circuit is completed for the operating winding 292w of the motor control relay 292. This circuit can be traced from energized conductor 281 through contacts 87b of the limit switch assembly, contacts 290b, contacts 291a, winding 292w, and manual interlock switch 57 to the energized conductor 282. As soon as motor control relay 292 is energized, its contacts 292b are closed in parallel with contacts 290b of the auxiliary relay 290 and thus a sealing circuit is provided for holding the winding 292w energized after the control switch 288 is opened and auxiliary relay 290 is deenergized. The motor 25 now is energized over a circuit which can be traced from energized conductor 281 through contacts 292d, armature 25a, field winding 25f, and contact 292c to energized conductor 282. The motor 25 then operates to drive the pump 32 in such direction as to close check valve 202 and open check valve 201. This is accomplished by flow of hydraulic fluid through the ports in the valve bodies 203 and 204 assisted by vacuum created by the pump 32. The hydraulic fluid then flows from the reservoir 63 through the check valve 201 into the conduit 19 to the pump 32 and is forced thereby under pressure through the conduit 20 and the end portion 206 of the check valve chamber into passageway 214 which is a pilot passageway. It will be recalled that the passageway 214 is connected to the lower valve chamber 154 of the accumulator valve 148 and that this lower valve chamber is connected by a passageway 196 to the lower valve chamber 122 of the directional valve 116. Hydraulic pressure then is applied to pistons 136 and 168. Since the area of the former is greater than that of the latter, it is operated first to lift the valve member 126 off of its sat. This places passageway 144 connected to the rear cylinder space 102 in communication with the passageways 146 and 194. Also it places the passageway 144 in communication with the passageway through tube 94 which is connected through the restricted orifice 98 in the valve 96 to the front cylinder space 101. Shortly after the valve member 126 of the directional valve 116 is lifted, the valve member 158 of the accumulator valve 148 is lifted. This places the passageway 194 in communication with the passageway 191. It will be recalled that passageway 191 is connected by passageway 192 with passageways 232 and 239 and thereby with the space 244 within the flexible bellows 242. Accordingly the hydraulic fluid is forced out of the bellows 242 by pressure of air within the cylindrical chamber 223 of the accumulator 93 and hydraulic pressure is applied to both the front side 72 and the rear side 74 of the ram 71. Because of the difference in area a differential action results in the application of twice the force to the rear side 74 of the ram 71 that is applied to the front side 72. Accordingly the ram 74 moves from the left-hand end of the ram cylinder 65 to the right-hand end.

The initial movement of the piston 168 of the accumulator valve 148 is accompanied by upward movement of the feed valve 184. As previously described this conjoint movement continues until the valve member 158 is lifted off of its seat. After this has taken place the head 186 of the feed valve 184 engages the associated stop 188. As the result further upward movement of the feed valve 184 is arrested and the lower end 177 of the passageway 176 through the valve stem 156 is opened. The hydraulic pressure in the lower valve chamber 154 then is sufficient to lift the ball check valve 180 against the downward biasing force of the spring 182 and the pressure exerted by the hydraulic fluid thereabove. The hydraulic fluid then is permitted to flow through the passageway 176 for the purpose of recharging the accumulator 93 when the ram 71 has been moved to its alternate position. The speed at which the ram 71 is moved in the ram cylinder 65 is controlled in this instance by the rate at which the hydraulic fluid flows through the restricted orifice 98 in the valve 96. The hydraulic fluid is forced through the restricted orifice 98 on forward movement of the ram 71.

Shortly after the hydraulic fluid is discharged from the accumulator 93, the volume control switch 272 is operated to close its contacts 272a and 272b.

When the ram 71 has been moved to the opposite end of the cylinder 65, and the electric circuit breaker 10 has been fully closed, the contacts 87a and 87b of the limit switch assembly 87 are opened and contacts 87c and 87d are closed. Except for the fact that contacts 272b of the volume control switch 272 are closed, the previously traced energizing circuit for the operating winding 292w of the motor control relay 92 would be opened. However, it is desirable to continue the operation of the pump 32 for the purpose of recharging the accumulator 93. Accordingly, another energizing circuit for the operating winding 292w is established. This circuit can be traced from the energized conductor 281 through contacts 87c, contacts 272b, contacts 289a, contacts 291a, operating winding 292w, and manual interlock switch 57 to energized conductor 282. The motor 25 continues to drive the pump 32 until the accumulator 93 is again charged with a predetermined volume of the hydraulic fluid. Thereupon the volume control switch 272 is operated to open the energizing circuit for the operating winding 292w which has just been traced at contacts 272b. As a result of the deenergization of the motor control relay 292, the motor 25 is deenergized.

The position of the electric circuit breaker 10 is indicated by a red indicating light 303 and a green indicating light 304. When the electric circuit breaker 10 is closed, contacts 87d are closed and the red indicating light 303 is energized. Likewise, when the electric circuit breaker 10 is opened, contacts 87a are closed and the green indicating light 304 is energized.

When it is desired to open the electric circuit breaker 10, the control switch 287 is closed to effect the energization of the auxiliary relay 289 in a manner similar to that in which the auxiliary relay 290 was energized. Following energization of the auxiliary relay 289, the motor control relay 291 is energized and locked in. The armature 25a of the motor 25 is then connected in series with a field winding 25r. As a result the armature 25a rotates in a direction which is the reverse of its direction of rotation when the motor control relay 292 is energized. Since the circuits involved are obvious from the preceding description, they will not be described in detail.

On operation of the pump 32 in the reverse direction, the check valve 201 is closed and the check valve 202 is opened. The directional valve 115 is operated first, followed by operation of the accumulator valve 147 in the manner previously described. When the valve member 157 of the accumulator valve 147 is lifted from its seat, the accumulator 93 can discharge through passageways 232, 239, 192, 191, upper valve chamber 149 of the accumulator valve 147, passageway 193, intermediate valve chamber 152 of accumulator valve 148 and passageways 194 and 94 (valve 96 being opened), passageway 100 into the front cylinder space 101. The hydraulic pressure applied against the front side 72 of the ram 71 causes it to move from right to left. The hydraulic fluid in the rear cylinder space 102 is forced through the restricted orifice 145' and into the passageway 145. Since the valve member 125 of the directional valve 115 is lifted, the hydraulic fluid flows into the upper valve chamber 117 and thence through the intermediate chamber 119 and passageway 143 back to the reservoir 63.

Since the area of the front side 72 of the ram 71 is equal to the effective area of the rear side 74, the ram moves from right to left on application of the same pressure at the same speed that it moves from left to right as previously described. This makes it possible to control accurately and positively the operation of the electric circuit breaker 10 in its movement to and from the switch closed position.

It will be understood that long intervals of time may elapse between operations of the system here disclosed. For example, it may not be required to operate the electric circuit breaker 10 more often than every several months. However, it is essential that the accumulator 93 retain the required volume of hydraulic fluid at the proper pressure to operate the system. While it is possible to manufacture the various valves with such precision that no leakage from the flexible bellows 242 takes place, it is preferable that some leakage take place therefrom to cause periodic operation of the controls and keep them in operating condition. By manufacturing the valves with only fair tolerances, it is possible to have the motor 25 operated once every two or three days to restore the charge of hydraulic fluid in the accumulator 93 to the desired volume. The motor 25 operates the pump 32 in the same direction that it last operated it under these circumstances. There is then no likelihood of effecting an operation of the electric circuit breaker 10. This can occur only when one or the other of the master control switches 287 or 288 is operated. Operating pressure is maintained against one side or the other of the ram 71 by the periodic restoration of hydraulic fluid to the accumulator 93. It follows that the electric circuit breaker 10 is likewise maintained in either the closed or the open position.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim:

1. In a hydraulic system for operating a mechanism from one position to another position, in combination; an actuating device including a ram cylinder, a ram slidable therein, and a rod extending from said ram out of said ram cylinder for connection to a movable part of said mechanism; a hydraulic accumulator, conduit means interconnecting opposite ends of said ram cylinder and said accumulator to apply hydraulic pressure to opposite sides of said ram, a pair of accumulator valves interposed in said conduit means and pressure responsive means to operate the associated accumulator valve for selectively operatively connecting said accumulator to opposite sides of said ram, a pair of directional valves interposed in said conduit means and pressure responsive means to operate the associated directional valve for selectively exhausting that end of said ram cylinder opposite the end out of which said rod extends and for controlling the flow of hydraulic fluid between said ends of said cylinder, a reversible pump, conduit means connecting one side of said pump commonly to one of said accumulator valve operating means and to one of said directional valve operating means, and conduit means connecting the other side of said pump commonly to the other accumulator valve operating means and to the other directional valve operating means whereby said valves are operated and pressure from said accumulator is applied to said ram to operate it in one direction or the other depending upon the direction in which said pump is operated.

2. In a hydraulic system for operating a mechanism from one position to another position, in combination; an actuating device including a ram cylinder, a ram slidable therein, and a rod extending from said ram out of said ram cylinder for connection to a movable part of said mechanism; a hydraulic accumulator, conduit means interconnecting opposite ends of said ram cylinder and said accumulator to apply hydraulic pressure to opposite sides of said ram, a pair of accumulator valves interposed in said conduit means and pressure responsive means to operate the associated accumulator valve for selectively operatively connecting said accumulator to opposite sides of said ram, a pair of directional valves interposed in said conduit means and pressure responsinve means to operate the associated directional valve for selectively exhausting that end of said ram cylinder opposite the end out of which said rod extends and for controlling the flow of hydraulic fluid between said ends of said cylinder, a reversible pump, conduit means connecting one side of said pump commonly to one of said accumulator valve operating means and to one of said directional valve operating means, conduit means connecting the other side of said pump commonly to the other accumulator valve operating means and to the other directional valve operating means whereby said valves are operated and pressure from said accumulator is applied to said ram to operate it in one direction or the other depending upon the direction in which said pump is operated, continued operation of said pump in the same direction acting to recharge said accumulator, and control means responsive to the restoration of said accumulator to predetermined charged condition for stopping said pump.

3. In a hydraulic system for operating a mechanism from one position to another position, in combination; an actuating device including a ram cylinder, a ram slidable therein, and a rod extending from said ram out of said ram cylinder for connection to a movable part of said mechanism; a hydraulic accumulator, conduit means interconnecting opposite ends of said ram cylinder and said accumulator to apply hydraulic pressure to opposite sides of said ram, a pair of accumulator valves interposed in said conduit means and pressure responsive means to operate the associated accumulator valve for selectively operatively connecting said accumulator to opposite sides of said ram, a pair of directional valves interposed in said conduit means and pressure responsive means to operate the associated directional valve for selectively exhausting that end of said ram cylinder opposite the end out of which said rod extends and for controlling the flow of hydraulic fluid between said ends of said cylinder, a reversible pump, conduit means connecting one side of said pump commonly to one of said accumulator valve operating means and to one of said directional valve operating means, conduit means connecting the other side of said pump commonly to the other accumulator valve operating means and to the other directional valve operating means whereby said valves are operated and pressure from said accumulator is applied to said ram to operate it in one direction or the other depending upon the direction in which said pump is operated, continued operation of said pump in the same direction acting to recharge said accumulator, and control means responsive to the storing of a predetermined volume of hydraulic fluid in said accumulator for stopping said pump.

4. In a hydraulic system for operating a mechanism from one position to another position, in combination; an actuating device including a ram cylinder, a ram slidable therein, and a rod extending from said ram out of said ram cylinder for connection to a movable part of said mechanism; a hydraulic accumulator, conduit means interconnecting opposite ends of said ram cylinder and said accumulator to apply hydraulic pressure to opposite sides of said ram, a pair of accumulator valves interposed in said conduit means and a piston operatively connected to each accumulator valve for selectively operatively connecting said accumulator to opposite sides of said ram, a pair of directional valves interposed in said conduit means and a piston operatively connected to each directional valve for selectively exhausting that end of said ram cylinder opposite the end out of which said rod extends and for controlling the flow of hydraulic fluid between said ends of said cylinder, a reversible pump, conduit means connecting one side of said pump commonly to one of said accumulator valve pistons and to one of said directional valve pistons, conduit means connecting the other side of said pump commonly to the other accumulator valve piston and to the other directional valve piston whereby said valves are operated and pressure from said accumulator is applied to said ram to operate it in one direction or the other depending upon the direction in which said pump is operated, the effective area of each directional valve piston acted upon by pressure generated by said pump being greater than the effective area of the corresponding accumulator valve piston acted upon by the same pressure whereby each directional valve is opened before the associated accumulator valve is opened.

5. In a hydraulic system for operating a mechanism from one position to another position, in combination; an actuating device including a ram cylinder, a ram slidable therein, and a rod extending from said ram out of said ram cylinder for connection to a movable part of said mechanism; a hydraulic accumulator, conduit means interconnecting opposite ends of said ram cylinder and said accumulator to apply hydraulic pressure to opposite sides of said ram, a pair of accumulator valves interposed in said conduit means and pressure responsive means to operate the associated accumulator valve for selectively operatively connecting said accumulator to opposite sides of said ram, a pair of directional valves interposed in said conduit means and pressure responsive means to operate the associated directional valve for selectively exhausting that end of said ram cylinder opposite the end out of which said rod extends and for controlling the flow of hydraulic fluid between said ends of said cylinder, a reversible pump, conduit means connecting one side of said pump commonly to one of said accumulator valve operating means and to one of said directional valve operating means, conduit means connecting the other side of said pump commonly to the other accumulator valve operating means and to the other directional valve operating means, whereby said valves are operated and pressure from said accumulator is applied to said ram to operate it in one direction or the other depending upon the direction in which said pump is operated, the valve operating means of each of said accumulator valves having a passageway therethrough whereby continued operation of said pump in the same direction acts to recharge said accumulator, a check valve in said passageway held closed by pressure from said accumulator and opened by pressure generated by said pump, a feed valve biased to close said passageway whereby pressure from said pump applied to the valve operating means of each accumulator valve opens the same, stop means limiting movement of said feed valve whereby the associated passageway is opened on opening movement of the corresponding valve operating means, and control means responsive to restoration of said accumulator to predetermined charged condition for stopping said pump.

6. In a hydraulic system for operating a mechanism from one position to another position, in combination; an actuating device including a ram cylinder, a ram slidably therein, and a rod extending from said ram out of said ram cylinder for connection to a movable part of said mechanism, a hydraulic accumulator, conduit means interconnecting opposite ends of said ram cylinder and said accumulator to apply hydraulic pressure to opposite sides of said ram, a pair of accumulator valves interposed in said conduit means and a piston operatively connected to each accumulator valve for selectively operatively connecting said accumulator to opposite sides of said ram, a pair of directional valves interposed in said conduit means and a piston operatively connected to each directional valve for selectively exhausting that end of said ram cylinder opposite the end out of which said rod extends and for controlling the flow of hydraulic fluid between said ends of said cylinder, a reversible pump, conduit means connecting one side of said pump commonly to one of said accumulator valve pistons and to one of said directional valve pistons, conduit means connecting the other side of said pump commonly to the other accumulator valve piston and to the other directional valve piston whereby said valves are operated and pressure from said accumulator is applied to said ram to operate it in one direction or the other depending upon the direction in which said pump is operated, the effective area of each directional valve piston acted upon by pressure generated by said pump being greater than the effective area of the corresponding accumulator valve piston acted upon by the same pressure whereby each directional valve is opened before the associated accumulator valve is opened, the piston of each of said accumulator valves having a passageway therethrough whereby continued operation of said pump in the same direction acts to recharge said accumulator, a check valve in said passageway held closed by pressure from said accumulator and opened by pressure generated by said pump, a feed valve biased to close said passageway whereby pressure from said pump applied to the piston of each accumulator valve opens the same, stop means limiting movement of said feed valve whereby the associated passageway is opened on opening movement of the corresponding valve operating means, and control means responsive to restoration of said accumulator to predetermined charged condition for stopping said pump.

7. In a hydraulic system for operating a mechanism from one position to another position, in combination, an actuating device including a ram cylinder, a ram slidable therein, and a rod extending from said ram out of said ram cylinder for connection to a movable part of said mechanism; a hydraulic accumulator, conduit means interconnecting opposite ends of said ram cylinder and said accumulator to apply hydraulic pressure to opposite sides of said ram, a pair of accumulator valves interposed in said conduit means and pressure responsive means to operate the associated accumulator valve for selectively operatively connecting said accumulator to opposite sides of said ram, a pair of directional valves interposed in said conduit means and pressure responsive means to operate the associated directional valve for selectively exhausting that end of said ram cylinder opposite the end out of which said rod extends and for controlling the flow of hydraulic fluid between said ends of said cylinder, a reversible pump, conduit means connecting one side of said pump commonly to one of said accumulator valve operating means and to one of said directional valve operating means, conduit means connecting the other side of said pump commonly to the other accumulator valve operating means and to the other directional valve operating means whereby said valves are operated and pressure from said accumulator is applied to said ram to operate it in one direction or the other depending upon the direction in which said pump is operated, a reservoir for holding a supply of hydraulic fluid, supply conduit means commonly connecting said reservoir to said conduit means connected to opposite sides of said pump, a pair of opposed check valves in said supply conduit means arranged to be opened selectively depending upon the direction of operation of said pump, and interlocking means between said check valves whereby when one is open the other is closed and vice versa.

8. In a hydraulic system for operating a mechanism from one position to another position, in combination; an actuating device including a ram cylinder, a ram slidable in said cylinder having a rod extending from the front side thereof out of the front end of said ram cylinder for connection to a movable part of said mechanism, a valve head at the rear end of said ram cylinder, a hydraulic accumulator chamber containing a charge of gas under pressure carried by said valve head, a flexible bellows inside of said chamber secured at one end to a wall thereof and having a plate at the other end, said wall having a passageway therethrough, a rod secured to said plate and extending out of said chamber through said passageway, said valve head having passageways interconnecting the ends of said ram cylinder on the front and rear sides of said ram and the interior of said flexible bellows and said reservoir, accumulator valves interposed in said passageways in said valve head and pressure responsive means to operate the associated accumulator valve for controlling the flow of hydraulic fluid from said flexible bellows to one side or the other of said ram, directional valves interposed in said passageways in said valve head and pressure responsive means to operate the associated directional valve for controlling the flow of hydraulic fluid between opposite sides of said ram and the exhaust of hydraulic fluid from the rear side of said ram to said reservoir, check valves interposed in said passageways in said valve head for controlling the direction of flow of hydraulic fluid from said reservoir and thereby the operation of said accumulator and directional valve operating means, and volume control switch means carried by said valve head and operatively connected to said rod and arranged to be operated thereby when the volume of hydraulic fluid in said bellows exceeds a predetermined volume; a power unit remote from said actuating device including a reversible electric motor, a reversible pump driven thereby, and electric control means therefor; conduit means interconnecting opposite sides of said pump and said passageways in said valve head with said check valves therebetween, electric circuit means connecting said volume control switch means with said electric control means, electric circuit means for connecting said electric control means to a current source, and master control means for said electric control means for initiating the operation thereof.

9. In a hydraulic system for operating a mechanism from one position to another position, in combination; an actuating device including a ram cylinder, a reservoir surrounding said ram cylinder for holding a supply of hydraulic fluid, a ram slidable in said cylinder having a rod extending from the front side thereof out of the front end of said ram cylinder for connection to a movable part of said mechanism, a valve head at the rear end of said ram cylinder, a hydraulic accumulator chamber containing a charge of gas under pressure carried by said valve head, a flexible bellows inside of said chamber secured at one end to a wall thereof and having a plate at the other end, said wall having a passageway therethrough, a rod secured to said plate and extending out of said chamber through said passageway, said valve head having passageways interconnecting the ends of said ram cylinder on the front and rear side of said ram and the interior of said flexible bellows and said reservoir, accumulator valves interposed in said passageways in said valve head and pressure responsive means to operate the associated accumulator valve for controlling the flow of hydraulic fluid from said flexible bellows to one side or the other of said ram, directional valves interposed in said passageways in said valve head and pressure responsive means to operate the associated directional valve for controlling the flow of hydraulic fluid between opposite sides of said ram and the exhaust of hydraulic fluid from the rear side of said ram to said reservoir, check valves interposed in said passageways in said valve head for controlling the direction of flow of hydraulic fluid from said reservoir and thereby the operation of said accumulator and directional valve operating means, a bleed valve interposed in a passageway in said valve head between said bellows and said reservoir and operatively connected in said rod and arranged to be opened thereby when the volume of hydraulic fluid in said bellows exceeds a predetermined volume, and volume control switch means carried by said valve head and operatively connected to said rod and arranged to be operated thereby when the volume of hydraulic fluid in said bellows exceeds a predetermined volume; a power unit remote from said actuating device including a reversible electric motor, a reversible pump driven thereby, and electric control means therefor; conduit means interconnecting opposite sides of said pump and said passageways in said valve head with said check valves therebetween, electric circuit means connecting said volume control switch means with said electric control means, electric circuit means for connecting said electric control means to a current source, and master control means for said electric control means for initiating the operation thereof.

10. In a hydraulic system for operating a mechanism from one position to another position, in combination; an actuating device including a ram cylinder, a reservoir mounted on said ram cylinder for holding a supply of hydraulic fluid, a ram slidable in said cylinder having a rod extending from the front side thereof out of the front end of said ram cylinder for connection to a movable part of said mechanism, a valve head at the rear end of said ram cylinder, a hydraulic accumulator chamber containing a charge of gas under pressure carried by said valve head, a flexible bellows inside of said chamber secured at one end to a wall thereof and having a plate at the other end, said wall having a passageway therethrough, a rod secured to said plate and extending out of said chamber through said pasageway, said valve head having passageways interconnecting the ends of said ram cylinder on the front and rear side of said ram and the interior of said flexible bellows and said reservoir, accumulator valves interposed in said passageways in said valve head and pressure responsive means to operate the associated accumulator valve for controlling the flow of hydraulic fluid from said flexible bellows to one side or the other of said ram, directional valves interposed in said passageways in said valve head and pressure responsive means to operate the associated directional valve for controlling the flow of hydraulic fluid between opposite sides of said ram and the exhaust of hydraulic fluid from the rear side of said ram to said reservoir, check valves interposed in said passageways in said valve head for controlling the direction of flow of hydraulic fluid from said reservoir and thereby the operation of said accumulator and directional valve operating means, a bleed valve interposed in a passageway in said valve head between said bellows and said reservoir and operatively connected to said rod and arranged to be opened thereby when the volume of hydraulic fluid in said bellows exceeds a predetermined volume, volume control switch means carried by said valve head and operatively connected to said rod and arranged to be operated thereby when the volume of hydraulic fluid in said bellows exceeds a predetermined volume, limit switch means carried by said valve head, and operating means interconnecting said ram rod and said limit switch means for operating the same at either limit of travel of said ram; a power unit remote from said actuating device including a reversible electric motor, a reversible pump driven thereby, and electric control means therefor; conduit means interconnecting opposite sides of said pump and said passageways in said valve head with said check valves therebetween, electric circuit means connecting said volume control switch means and said limit switch means with said electric control means, electric circuit means for connecting said electric control means to a current source, and master control means for said electric control means for initiating the operation thereof.

11. In a hydraulic system for operating a mechanism from one position to another position, in combination; an actuating device including a ram cylinder, a reservoir surrounding said ram cylinder for holding a supply of hydraulic fluid, a ram slidable in said ram cylinder having a rod extending from the front side thereof out of the front end of said ram cylinder for connection to a movable part of said mechanism, a valve head at the rear end of said ram cylinder, a hydraulic accumulator chamber containing a charge of gas under pressure carried by said valve head, a flexible bellows inside of said chamber secured at one end to a wall thereof and having a plate at the other end, said wall having a passageway therethrough, a rod secured to said plate and extending out of said chamber through said passageway, said valve head having passageways interconnecting the ends of said ram cylinder on the front and rear side of said rod and the interior of said flexible bellows and said reservoir, accumulator valves interposed in said passageways in said valve head and pressure responsive means to operate the associated accumulator valve for controlling the flow of hydraulic fluid from said flexible bellows to one side or the other of the said ram, directional valves interposed in said passageways in said valve head and pressure responsive means to operate the associated directional valve for controlling the flow of hydraulic fluid between opposite sides of said ram and the exhaust of hydraulic fluid from the rear side of said ram to said reservoir, check valves interposed in said passageways in said valve head for controlling the direction of flow of hydraulic fluid from said reservoir and thereby the operation of said accumulator and directional valve operating means, a bleed valve interposed in a passageway in said valve head between said bellows and said reservoir and operatively connected to said rod and arranged to be opened thereby when the volume of hydraulic fluid in said bellows exceeds a predetermined volume, volume control switch means carried by said valve head and operatively connected to said rod and arranged to be operated thereby when the volume of hydraulic fluid in said bellows exceeds a predetermined volume, limit switch means carried by said valve head, operating means interconnecting said ram rod and said limit switch means for operating the same at either limit of travel of said ram, and support means secured to said valve head and pivotally mounting the same and the aforesaid elements associated therewith; a power unit remote from said actuating device including a reversible electric motor, a reversible pump driven thereby, and electric control means therefor, conduit means interconnecting opposite sides of said pump and said passageways in said valve head with said check valves therebetween, electric circuit means connecting said volume control switch means and said limit switch means with said electric control means, electric circuit means for connecting said electric control means to a current source, and master control means for said electric control means for initiating the operation thereof.

12. In a hydraulic system for operating a mechanism from one position to another position, in combination; an actuating device including a ram cylinder, a ram slidable therein, and a rod extending from the front side of said ram out of said ram cylinder for connection to a movable part of said mechanism; a hydraulic accumulator including a chamber containing a charge of gas under pressure, and a flexible bellows inside said chamber secured at one end to a wall thereof; a pair of accumulator valves each including a valve chamber, a valve stem slidable therein and having an intermediate portion of said valve chamber between the ends of said stem, said one end of said valve stem having a piston integral therewith, and a valve member at the other end of said valve stem for engaging a valve seat and closing off an end portion of said valve chamber; a pair of directional valves each including a valve chamber, and a valve stem slidable therein having a piston at one end and a valve member at the other end for engaging a valve seat and closing off an end portion of the last mentioned valve chamber, there being an intermediate valve chamber portion around the last mentioned valve stem; a reservoir for holding a supply of hydraulic fluid at atmospheric pressure; check valve means including a check valve chamber having an intermediate portion connected to said reservoir, a pair of check valve members slidable in said check valve chamber and biased toward valve seats at the ends of said intermediate portion thereof, and interengaging stem portions on said check valve members insuring that one of them is unseated when the other is seated; a reversible pump, a reversible electric motor driving said pump, conduit means interconnecting the interior of said flexible bellows and said end portions of said valve chamber in said accumulator valves closed off by said valve members thereof; conduit means interconnecting said intermediate portions of said valve chambers in said accumulator valves, said end portions of the valve chamber of one of said directional valves, and said ram cylinder on the front side of said ram; conduit means interconnecting said ram cylinder on the rear side of said ram and the intermediate valve chamber of said one directional valve, conduit means interconnecting said ram cylinder on the rear side of said ram and the end portion of the valve chamber of the other directional valve, conduit means interconnecting the intermediate valve chamber portion of said other directional valve and said reservoir; conduit means interconnecting one side of said pump, one end of said check valve chamber, and those portions of the valve chambers of one of said accumulator valves and said other directional valve in which their respective pistons are slidable; conduit means interconnecting the other side of said pump, the other end of said check valve chamber, and those portions of the valve chamber of the other of said accumulator valves and of said one directional valve in which their respective pistons are slidable; reversible electric control means for connecting said motor for energization to a current source, switch means for initiating the operation of said control means to energize said motor and thereby operate said pump in one direction or the other to move said ram from one end of said ram cylinder to the other, and limit switch means operable at the ends of the forward and reverse strokes of said ram for opening the energizing circuit for said motor.

13. In a hydraulic system for operating a mechanism from one position to another position, in combination; an actuating device including a ram cylinder, a ram slidable therein, and a rod extending from the front side of said ram out of said ram cylinder for connection to a movable part of said mechanism; a hydraulic accumulator including a chamber containing a charge of gas under pressure, and a flexible bellows inside said chamber secured at one end to a wall thereof; a pair of accumulator valves each including a valve chamber, a valve stem slidable therein and having an intermediate portion of said valve chamber between the ends of said stem, said one end of said valve stem having a piston integral therewith, and a valve member at the other end of said valve stem for engaging a valve seat and closing off an end portion of said valve chamber; a pair of directional valves each including a valve chamber, and a valve stem slidable therein having a piston at one end the area of which is greater than the area of said piston of said accumulator valve and a valve member at the other end for engaging a valve seat and closing off an end portion of the last mentioned valve chamber, there being an intermediate valve chamber portion around the last mentioned valve stem; a reservoir for holding a supply of hydraulic fluid at atmospheric pressure; check valve means including a check valve chamber having an intermediate portion connected to said reservoir, a pair of check valve members slidable in said check valve chamber and biased toward valve seats at the ends of said intermediate portion thereof, and interengaging stem portions on said check valve members insuring that one of them is unseated when the other is seated; a reversible pump, a reversible electric motor driving said pump, conduit means interconnecting the interior of said flexible bellows and said end portions of said valve chamber in said accumulator valve closed off by said valve members thereof; conduit means interconnecting said intermediate portions of said valve chambers in said accumulator valves, said end portions of the valve chamber of one of said directional valves, and said ram cylinder on the front side of said ram; a restricted orifice check valve in the last mentioned conduit means arranged to permit unrestricted flow of hydraulic fluid into said ram cylinder on the front side of said ram and to restrict the flow of said fluid therefrom, conduit means interconnecting said ram cylinder on the rear side of said ram and the intermediate valve chamber of said one directional valve, conduit means interconnecting said ram cylinder on the rear side of said ram and the end portion of the valve chamber of the other directional valve, there being a restricted orifice in the last mentioned conduit means, conduit means interconnecting the intermediate valve chamber portion of said other directional valve and said reservoir; conduit means interconnecting one side of said pump, one end of said check valve chamber, and those portions of the valve chambers of one of said accumulator valves and said other directional valve in which their respective pistons are slidable; conduit means interconnecting the other side of said pump, the other end of said check valve chamber, and those portions of the valve chamber of the other of said accumulator valves and of said one directional valve in which their respective pistons are slidable; reversible electric control means for connecting said motor for energization to a current source, switch means for initiating the operation of said control means to energize said motor and thereby operate said pump in one direction or the other to move said ram from one end of said ram cylinder to the other, and limit switch means operable at the ends of the forward and reverse strokes of said ram for opening the energizing circuit for said motor.

14. In a hydraulic system for operating a mechanism from one position to another position, in combination; an actuating device including a ram cylinder, a ram slidable therein, and a rod extending from the front side of said ram out of said ram cylinder for connection to a movable part of said mechanism; a hydraulic accumulator including a chamber containing a charge of gas under pressure, a flexible bellows inside said chamber secured at one end to a wall thereof and having a plate at the other end, said wall having a passageway therethrough, and a rod secured to said plate and extending out of said chamber through said passageway; a pair of accumulator valves each including a valve chamber, a valve stem slidable therein having a passageway from one end opening into an intermediate portion of said valve chamber between the ends of said stem, said one end of said valve stem having a piston integral therewith, a valve member at the other end of said valve stem for engaging a valve seat and closing off an end portion of said valve chamber, and a check valve within said valve stem passageway held closed by pressure within said intermediate portion of said valve chamber; a pair of directional valves each including a valve chamber, and a valve stem slidable therein having a piston at one end and a valve member at the other end for engaging a valve seat and closing off an end portion of the last mentioned valve chamber, there being an intermediate valve chamber portion around the last mentioned valve stem; a reservoir for holding a supply of hydraulic fluid at atmospheric pressure; check valve means including a check valve chamber having an intermediate portion connected to said reservoir, a pair of check valve members slidable in said check valve chamber and biased toward valve seats at the ends of said intermediate portion thereof, and interengaging stem portions on said check valve members insuring that one of them is unseated when the other is seated; a reversible pump, a reversible electric motor driving said pump, conduit means interconnecting the interior of said flexible bellows and said end portions of said valve chamber in said accumulator valves closed off by said valve members thereof; conduit means interconnecting said intermediate portions of said valve chambers in said accumulator valves, said end portions of the valve chamber of one of said directional valves, and said ram cylinder on the front side of said ram; conduit means interconnecting said ram cylinder on the rear side of said ram and the intermediate valve chamber of said one directional valve, conduit means interconnecting said ram cylinder on the rear side of said ram and the end portion of the valve chamber of the other directional valve, conduit means interconnecting the intermediate valve chamber portion of said other directional valve and said reservoir; conduit means interconnecting one side of said pump, one end of said check valve chamber, and those portions of the valve chambers of one of said accumulator valves and said other directional valve in which their respective pistons are slidable; conduit means interconnecting the other side of said pump, the other end of said check valve chamber, and those portions of the valve chamber of the other of said accumulator valves and of said one directional valve in which their respective pistons are slidable; reversible electric control means for connecting said motor for energization to a current source, switch means for initiating the operation of said control means to energize said motor and thereby operate said pump in one direction or the other to move said ram from one end of said ram cylinder to the other, limit switch means operable at the ends of the forward and reverse strokes of said ram for opening the energizing circuit for said motor and closing another energizing circuit therefor, and volume control switch means actuated by said rod of said accumulator and cooperating with said limit switch means to maintain said motor energized to continue the operation of said pump in the direction in which it has been operating to move said ram for recharging said accumulator, movement of said rod to a position corresponding to a predetermined volume of hydraulic fluid in said bellows effecting opening of said volume control switch means and deenergization of said motor.

15. In a hydraulic system for operating a mechanism from one position to another position, in combination; an actuating device including a ram cylinder, a ram slidable therein, and a rod extending from the front side of said ram out of said ram cylinder for connection to a movable part of said mechanism; a hydraulic accumulator including a chamber containing a charge of gas under pressure, a flexible bellows inside said chamber secured at one end to a wall thereof and having a plate at the other end, said wall having a passageway therethrough, and a rod secured to said plate and extending out of said chamber through said passageway; a pair of accumulator valves each including a valve chamber, a valve stem slidable therein having a passageway from one end opening into an intermediate portion of said valve chamber between the ends of said stem, said one end of said valve stem having a piston integral therewith, a valve member at the other end of said valve stem for engaging a valve seat and closing off an end portion of said valve chamber, a check valve within said valve stem passageway held closed by pressure within said intermediate portion of said valve chamber, a feed valve member exterior of said stem and biased to close off said one end of said passageway therein and movable therewith, and stop means limiting movement of said feed valve member while said stem continues to move to open said one end of said passageway; a pair of directional valves each including a valve chamber, and a valve stem slidable therein having a piston at one end and a valve member at the other end for engaging a valve seat and closing off an end portion of the last mentioned valve chamber, there being an intermediate valve chamber portion around the last mentioned valve stem; a reservoir around said ram cylinder for holding a supply of hydraulic fluid at atmospheric pressure; check valve means including a check valve chamber having an intermediate portion connected to said reservoir, a pair of check valve members slidable in said check valve chamber and biased toward valve seats at the ends of said intermediate portion thereof, and interengaging stem portions on said check valve members insuring that one of them is unseated when the other is seated; a reversible pump, a reversible electric motor driving said pump, conduit means interconnecting the interior of said flexible bellows and said end portions of said valve chamber in said accumulator valves closed off by said valve members thereof; conduit means interconnecting said intermediate portions of said valve chambers in said accumulator valves, said end portions of the valve chamber of one of said directional valves, and said ram cylinder on the front side of said ram; conduit means interconnecting said ram cylinder on the rear side of said ram and the intermediate valve chamber of said one directional valve, conduit means interconnecting said ram cylinder on the rear side of said ram and the end portion of the valve chamber of the other directional valve, conduit means interconnecting the intermediate valve chamber portion of said other directional valve and said reservoir; conduit means interconnecting one side of said pump, one end of said check valve chamber, and those portions of the valve chambers of one of said accumulator valves and said other directional valve in which their respective pistons are slidable; conduit means interconnecting the other side of said pump, the other end of said check valve chamber, and those portions of the valve chamber of the other of said accumulator valves and of said one directional valve in which their respective pistons are slidable; reversible electric control means for connecting said motor for energization to a current source, switch means for initiating the operation of said control means to energize said motor and thereby operate said pump in one direction or the other to move said ram from one end of said ram cylinder to the other, limit switch means operable at the ends of the forward and reverse strokes of said ram for opening the energizing circuit for said motor and closing another energizing circuit therefor, and a pair of volume control switches actuated by said rod of said accumulator and cooperating with said limit switch means to maintain said motor energized to continue the operation of said pump in the direction in which it has been operating to move said ram for recharging said accumulator, movement of said rod to a position corresponding to predetermined volume of hydraulic fluid in said bellows effecting opening of said volume control switches and deenergization of said motor.

16. In a hydraulic system for operating a mechanism from one position to another position, in combination; an actuating device including a ram cylinder, a ram slidable therein, and a rod extending from the front side of said ram out of said ram cylinder for connection to a movable part of said mechanism; a hydraulic accumulator including a chamber containing a charge of gas under pressure, a flexible bellows inside said chamber secured at one end to a wall thereof and having a plate at the other end, said wall having a passageway therethrough, and a rod secured to said plate and extending out of said chamber through said passageway; a pair of accumulator valves each including a valve chamber, a valve stem slidable therein having a passageway from one end opening into an intermediate portion of said valve chamber between the ends of said stem, said one end of said valve stem having a piston integral therewith, a valve member at the other end of said valve stem for engaging a valve seat and closing off an end portion of said valve chamber, a check valve within said valve stem passageway held closed by pressure within said intermediate portion of said valve chamber, a feed valve member exterior of said stem and biased to close off said one end of said passageway therein and movable therewith, and stop means limiting movement of said feed valve member while said stem continues to move to open said one end of said passageway; a pair of directional valves each including a valve chamber, and a valve stem slidable therein having a piston at one end the area of which is greater than the area of said piston of said accumulator valve and a valve member at the other end for engaging a valve seat and closing off an end portion of the last mentioned valve chamber, there being an intermediate valve chamber portion around the last mentioned valve stem; a reservoir around said ram cylinder for holding a supply of hydraulic fluid at atmospheric pressure; check valve means including a check valve chamber having an intermediate portion connected to said reservoir, a pair of check valve members slidable in said check valve chamber and biased toward valve seats at the ends of said intermediate portion thereof, and interengaging stem portions on said check valve members insuring that one of them is unseated when the other is seated; a reversible pump, a reversible electric motor driving said pump, conduit means interconnecting the interior of said flexible bellows and said end portions of said valve chamber in said accumulator valves closed off by said valve members thereof; conduit means interconnecting said intermediate portions of said valve chambers in said accumulator valves, said end portions of the valve chamber of one of said directional valves, and said ram cylinder on the front side of said ram; a restricted orifice check valve in the last mentioned conduit means arranged to permit unrestricted flow of hydraulic fluid into said ram cylinder on the front side of said ram and to restrict the flow of said fluid therefrom, conduit means interconnecting said ram cylinder on the rear side of said ram and the end portion of the valve chamber of the other directional valve, there being a restricted orifice in the last mentioned conduit means, conduit means interconnecting the intermediate valve chamber portion of said other directional valve and said reservoir; conduit means interconnecting one side of said pump, one end of said check valve chamber, and those portions of the valve chambers of one of said accumulator valves and said other directional valve in which their respective pistons are slidable; conduit means interconnecting the other side of said pump, the other end of said check valve chamber, and those portions of the valve chamber of the other of said accumulator valves and of said one directional valve in which their respective pistons are slidable; reversible electric control means for connecting said motor for energization to a current source, switch means for initiating the operation of said control means to energize said motor and thereby operate said pump in one direction or the other to move said ram from one end of said ram cylinder to the other, limit switch means operable at the ends of the forward and reverse strokes of said ram for opening the energizing circuit for said motor and closing another energizing circuit therefor, and a pair of volume control switches actuated by said rod of said accumulator and cooperating with said limit switch means to maintain said motor energized to continue the operation of said pump in the direction in which it has been operating to move said ram for recharging said accumulator, movement of said rod to a position corresponding to a predetermined volume of hydraulic fluid in said bellows effecting opening of said volume control switches and deenergization of said motor.

17. In a hydraulic system for operating a mechanism from one position to another position, in combination; an actuating device including a ram cylinder, and a ram slidable therein for connection to a movable part of said mechanism; a hydraulic accumulator, conduit means interconnecting opposite ends of said ram cylinder and said accumulator to apply hydraulic pressure to opposite sides of said ram, a pair of accumulator valves interposed in said conduit means and pressure responsive means to operate the associated accumulator valve for selectively operatively connecting said accumulator to opposite sides of said ram, a pair of directional valves interposed in said conduit means and pressure responsive means to operate the associated directional valve for selectively exhausting hydraulic fluid from said ends of said cylinder, a reversible pump, conduit means connecting one side of said pump commonly to one of said accumulator valve operating means and to one of said directional valve operating means, and conduit means connecting the other side of said pump commonly to the other accumulator valve operating means and to the other directional valve operating means whereby said valves are operated and pressure from said accumulator is applied to said ram to operate it in one direction or the other depending upon the direction in which said pump is operated.

18. In a hydraulic system for operating a mechanism from one position to another position, in combination; an actuating device including a ram cylinder, and a ram slidable therein for connection to a movable part of said mechanism; a hydraulic accumulator, conduit means interconnecting opposite ends of said ram cylinder and said accumulator to apply hydraulic pressure to opposite sides of said ram, valve means interposed in said conduit means and operating means therefor for controlling the direction in which hydraulic pressure is applied to said ram, a reversible pump connected to said valve operating means for selectively controlling the same so that hydraulic pressure from said accumulator is applied to said ram to operate it in one direction or the other depending upon the direction in which said pump is operated, a reservoir for hydraulic fluid connected to opposite sides of said pump, a check valve interposed between each side of said pump and said reservoir and responsive to the direction of operation of said pump for connecting said reservoir to the vacuum side of said pump, continued operation of said pump in the same direction for operating said valve means to move said ram in one direction acting to recharge said accumulator through said valve means.

19. In a hydraulic system for operating a mechanism from one position to another position, in combination; an actuating device including a ram cylinder, and a ram slidable therein for connection to a movable part of said mechanism; a hydraulic accumulator, conduit means interconnecting one end of said ram cylinder and said accumulator to apply hydraulic pressure to one side of said ram; an accumulator valve interposed in said conduit means and normally closed by pressure from said accumulator, pressure responsive means operatively connected to said valve for opening the same and having a passageway therethrough, and normally closed check valve means in the latter; and means for applying hydraulic pressure to said pressure responsive means to open said accumulator valve for moving said ram and for opening said check valve to supply hydraulic pressure through said passageway to recharge said accumulator.

20. In a hydraulic system for operating a mechanism from one position to another position, in combination; an actuating device including a ram cylinder, and a ram slidable therein for connection to a movable part of said mechanism; a hydraulic accumulator, conduit means interconnecting one end of said ram cylinder and said accumulator to apply hydraulic pressure to one side of said ram; an accumulator valve interposed in said conduit means and normally closed by pressure from said accumulator, pressure responsive means operatively connected to said valve for opening the same and having a passageway therethrough, and normally closed check valve means in the latter; a reservoir connected by conduit means to the other end of said ram cylinder having a directional valve therein normally biased to closed position, pressure responsive means operatively connected to said directional valve for opening the same, and means for applying hydraulic pressure to both said pressure responsive means to open the respective valves for moving said ram and for opening said check valve to supply hydraulic pressure through said passageway to recharge said accumulator.

21. In a hydraulic system for operating a mechanism from one position to another position, in combination; an actuating device including a ram cylinder, a ram slidable therein, and a rod extending from one side of said ram out of said cylinder for connection to a movable part of said mechanism; a hydraulic accumulator, conduit means interconnecting both ends of said ram cylinder and said accumulator to apply hydraulic pressure to both sides of said ram; an accumulator valve interposed in said conduit means and normally closed by pressure from said accumulator, pressure responsive means operatively connected to said valve for opening the same and having a passageway therethrough, and normally closed check valve means in the latter; and means for applying hydraulic pressure to said pressure responsive means to open said accumulator valve for moving said ram and for opening said check valve to supply hydraulic pressure through said passageway to recharge said accumulator.

22. In a hydraulic system for operating a mechanism from one position to another position, in combination; an actuating device including a ram cylinder, a ram slidable therein, and a rod extending from one side of said ram out of said cylinder for connection to a movable part of said mechanism; a hydraulic accumulator, conduit means interconnecting both ends of said ram cylinder and said accumulator to apply hydraulic pressure to both sides of said ram; an accumulator valve interposed in said conduit means and normally closed by pressure from said accumulator, pressure responsive means operatively connected to said valve for opening the same and having a passageway therethrough, and normally closed check valve means in the latter; a directional valve in said conduit means interconnecting the ends of said ram cylinder and normally biased to closed position, pressure responsive means operatively connected to said directional valve for opening the same, and means for applying hydraulic pressure to both said pressure responsive means to open the respective valves for moving said ram and for opening said check valve to supply hydraulic pressure through said passageway to recharge said accumulator.

23. In a hydraulic system for operating a mechanism from one position to another position, in combination; an actuating device including a ram cylinder, a ram slidable therein, and a rod extending from one side of said ram out of said cylinder for connection to a movable part of said mechanism; a hydraulic accumulator, first conduit means interconnecting one end of said ram cylinder and said accumulator to apply hydraulic pressure to one side of said ram; a first accumulator valve interposed in said first conduit means and normally closed by pressure from said accumulator, pressure responsive means operatively connected to said first accumulator valve for opening the same and having a passageway therethrough, and normally closed check valve means in the latter; second conduit means interconnecting both ends of said ram cylinder and said accumulator to apply hydraulic pressure to both sides of said ram; a second accumulator valve interposed in said second conduit means and normally closed by pressure from said accumulator, pressure responsive means operatively connected to said second accumulator valve for opening the same and having a passageway therethrough, and normally closed check valve means in the latter; and means for selectively applying hydraulic pressure to said pressure responsive means to open the respective accumulator valve for moving said ram in one direction or the other and for opening the respective check valve to supply hydraulic pressure through the respective passageway to recharge said accumulator.

24. In a hydraulic system for operating a mechanism from one position to another position, in combination; an actuating device including a ram cylinder, a ram slidable therein, and a rod extending from one side of said ram out of said cylinder for connection to a movable part of said mechanism; a hydraulic accumulator, first conduit means interconnecting one end of said ram cylinder and said accumulator to apply hydraulic pressure to one side of said ram; a first accumulator valve interposed in said first conduit means and normally closed by pressure from said accumulator, pressure responsive means operatively connected to said first accumulator valve for opening the same and having a passageway therethrough, and normally closed check valve means in the latter; a reservoir connected by conduit means to the other end of said ram cylinder having a first directional valve therein normally biased to closed position, pressure responsive means operatively connected to said first directional valve for opening the same; second conduit means interconnecting both ends of said ram cylinder and said accumulator to apply hydraulic pressure to both sides of said ram; a second accumulator valve interposed in said second conduit means and normally closed by pressure from said accumulator, pressure responsive means operatively connected to said second accumulator valve for opening the same and having a passageway therethrough, and normally closed check valve means in the latter; a second directional valve in said second conduit means interconnecting the ends of said ram cylinder and normally biased to closed position, pressure responsive means operatively connected to said second directional valve for opening the same, and means for selectively applying hydraulic pressure to said pressure responsive means associated with said first accumulator valve and said first directional valve and with said second accumulator valve and said second directional valve to selectively operate the same for moving said ram in one direction or the other and for opening the respective check valve to supply hydraulic pressure through the respective passageway to recharge said accumulator.

References Cited in the file of this patent
UNITED STATES PATENTS

| | | |
|---|---|---|
| 577,489 | Mills | Feb. 23, 1897 |
| 1,812,587 | Ellis | June 30, 1931 |
| 2,020,951 | Lemon | Nov. 12, 1935 |
| 2,072,488 | Stacy | Mar. 2, 1937 |
| 2,336,887 | Piron | Dec. 14, 1943 |
| 2,352,390 | Kirkland | June 27, 1944 |
| 2,388,755 | McLeod | Nov. 13, 1945 |
| 2,412,053 | Lucien | Dec. 3, 1946 |
| 2,449,482 | Hufferd | Sept. 14, 1948 |
| 2,451,689 | Nelson | Oct. 19, 1948 |
| 2,586,682 | McLeod | Feb. 19, 1852 |
| 2,597,047 | Ainsworth | May 20, 1952 |
| 2,640,323 | McLeod | June 2, 1953 |
| 2,657,533 | Schanzlin et al. | Nov. 3, 1953 |

FOREIGN PATENTS

| | | |
|---|---|---|
| 360,458 | Great Britain | Nov. 2, 1931 |